United States Patent [19]
Irie

[11] Patent Number: 5,681,594
[45] Date of Patent: Oct. 28, 1997

[54] TIRE VULCANIZER

[75] Inventor: Nobuhiko Irie, Nagasaki, Japan

[73] Assignee: Mitsubishi Jukogyo Kabushiki Kaisha, Tokyo, Japan

[21] Appl. No.: 550,292

[22] Filed: Oct. 30, 1995

[30] Foreign Application Priority Data

Oct. 31, 1994 [JP] Japan ..................... 6-267084
Dec. 13, 1994 [JP] Japan ..................... 6-309086

[51] Int. Cl.$^6$ ..................... B29C 35/00; B29D 30/06
[52] U.S. Cl. ..................... 425/34.1; 425/28.1; 425/38; 425/58.1
[58] Field of Search ..................... 425/28.1, 34.1, 425/38, 58.1

[56] References Cited

U.S. PATENT DOCUMENTS

| | | | |
|---|---|---|---|
| 1,900,456 | 3/1933 | Mead | 425/34.1 |
| 3,477,100 | 11/1969 | Pech et al. | 425/34.1 |
| 3,932,079 | 1/1976 | Legostaev et al. | 425/34.1 |
| 4,092,090 | 5/1978 | Yuhas et al. | |
| 4,578,023 | 3/1986 | Irie | 425/34.1 |
| 4,585,405 | 4/1986 | Capecchi | 425/34.1 |
| 4,728,274 | 3/1988 | Siegenthaler | 425/34.1 |
| 4,773,810 | 9/1988 | Nishimura et al. | 414/331 |

FOREIGN PATENT DOCUMENTS

| | | | |
|---|---|---|---|
| 0 246 496 | 11/1987 | European Pat. Off. | |
| 0 638 409 | 2/1995 | European Pat. Off. | |
| 2 399 910 | 3/1979 | France | |
| 2833235 | 2/1979 | Germany | 425/34.1 |
| 44 34 406 | 3/1995 | Germany | |
| 1125019 | 8/1968 | United Kingdom | |

*Primary Examiner*—James P. Mackey
*Attorney, Agent, or Firm*—Wenderoth, Lind & Ponack

[57] ABSTRACT

A tire vulcanizer is provided with a vulcanizing station where tire vulcanizing molds are arranged to perform vulcanization. The tire vulcanizer also includes a mold opening/closing station where, after the tire vulcanizing mold is opened, a vulcanized tire is taken out from the inside of the tire vulcanizing mold, and then an unvulcanized tire to be succeedingly vulcanized is inserted into the inside of the tire vulcanizing mold so as to be shaped before the tire vulcanizing mold is closed. Also, a mold carrier truck is provided which is movable between the vulcanizing mold and the mold opening/closing station. An unvulcanized tire storage section is disposed above each of the tire vulcanizing molds in the vulcanizing station.

7 Claims, 23 Drawing Sheets

TIRE VULCANIZER

BACKGROUND OF THE INVENTION

1. Field of the Invention

The present invention relates to a tire vulcanizer.

2. Description of the Related Art

The applicant of the present invention has previously already proposed (1) a tire vulcanizer split mold unit which does not eliminate a necessity of, for example, fastening a tire vulcanizing mold from the exterior of the tire vulcanizing mold so that the mold is prevented from opening during vulcanizing operation, by offsetting a force which is exerted to open the mold by the aid of a pressure of a heated and pressurized medium having a high temperature and a high pressure which is introduced into the inside of the tire when the tire is vulcanized; and (2) a tire vulcanizer which includes a vulcanizing station where plural pairs of tire vulcanizing molds (the above tire vulcanizing molds) are arranged to perform vulcanization, a mold opening/closing station where after the tire vulcanizing mold is opened, a vulcanized tire is taken out from the inside of the mold, and then an unvulcanized tire to be succeedingly vulcanized is inserted into the inside of the mold so as to be shaped before the tire vulcanizing mold is closed, and a mold carrier truck which is movable between the vulcanizing mold and the mold opening/closing station (as to the tire vulcanizer split mold unit of the above item (1), refer to Japanese Patent Application No. Hei 6-122661, and as to the tire vulcanizer of the above item (2), refer to Japanese Patent Application No. Hei 5-228961).

Now, the tire vulcanizer split mold unit of the above item (1) will be described with reference to FIGS. 23 to 27.

Vulcanizing stations 1 (1a and 1b) shown in FIG. 23 include a plurality of mold tables 5 (5a, 5b, 5c, . . . ) on which a plurality of tire vulcanizing molds M (Ma, Mb, Mc, . . . ) are mounted. Each of the mold tables 5 is equipped with mold moving means (for example, a cylinder-driven pusher) not shown, and as occasion demands, heated and pressurized medium supplement means, a piping or the like.

Mold opening/closing stations 2 (2a and 2b) includes mold opening/closing units 6 (6a and 6b) which are similar to a known tire vulcanizer (a difference therebetween will be described later), a known unloader 7a which takes a vulcanized tire out of the tire vulcanizing mold, and a known loader 8a which takes an unvulcanized tire in the tire vulcanizing mold. As occasion demands, the mold opening/closing stations 2 are equipped with a vulcanized tire carrier conveyor 9a, an unvulcanized tire rack 10a or the like.

Mold carrier trucks 3a and 3b shown in FIGS. 23 and 24 include rails 4 fixed to a floor, known trucks 3 (3a and 3b) which are guided by the rails 4 and travel by the operation of drive means not shown. A mold exchange station is comprised of a mold exchange table 11 which performs the exchange of a tread mold, a side wall mold or the like within the tire vulcanizing mold, the exchange of a bladder which is a consumable goods, and so on. The mold exchange table 11 has a mold opening/closing sequence necessary for those exchange works. It should be noted that, as occasion demands, a tire vulcanizing mold preheating chamber may be provided. Also, the mold exchange table 11 may be merely constituted by a table on which the tire vulcanizing mold is temporarily mounted, or the tire vulcanizing mold preheating chamber so that the tire vulcanizing mold is transported onto another place by a forklift or the like to perform the exchange of parts within the mold.

Subsequently, the tire vulcanizing slit mold unit will be described in more detail with reference to FIGS. 25 to 27. FIG. 25 shows a state in which, after an unvulcanized tire T is taken in the tire vulcanizing mold, the mold is closed, and a heated and pressurized medium is then introduced in the interior of the tire T through a bladder B to start vulcanization.

Reference numeral 101 denotes a substrate of a tire vulcanizing mold M, which is mounted on a frame 6e of the mold opening/closing unit 6a so as to be horizontally slidable thereon, and fixed to the frame 6e through a known lock unit (not shown).

Reference numeral 103 denotes a lower disc fixed onto the substrate 101 through a hard heat-insulating material 102 (the lower disc 103 also serves as a heating plate with the provision of a heated and pressurized medium passage); 105, a lower side wall mold fixed onto the lower disc 103; and 106, a lower bead ring having an outer peripheral surface which is engaged with a circumferential cylindrical surface of the lower side wall mold 105. The lower bead ring is detachably assembled into a flange 120a formed in the central outer periphery of a cylinder 120 through a clamper 108, and the lower portion of a bladder B is nipped between a bladder presser 107 which is fastened onto the lower bead ring 106 by bolts and the lower bead ring 106.

Reference numeral 109 denotes a tread mold divided into a plurality of pieces in the peripheral direction. When the tread mold 109 is closed, the outer peripheral surface of the tread mold 109 forms a conical surface which is for practical use. The tread mold 109 is fastened by bolts onto the inner peripheral surface of a segment 110 which is slidable on a pressure plate 104 fixed onto the flange 103b that is formed in the outer periphery of the lower disc 103.

Reference numeral 111 denotes an outer ring having a conical surface which is engaged with the outer peripheral surface of the segment 110 in the inner periphery thereof. A T-bar 111a, which is slidably engaged with a T-groove 110a formed vertically on the conical outer peripheral surface of the segment 110, is fixed onto the conical inner peripheral surface of the outer ring 111. A slide guide 115 is assembled in a plurality of arms 114a extending from the outer periphery of an upper disc 114 in a radial direction thereof, so as to be slidable in the radial direction thereof. The slide guide 115 is fixed onto the upper surface of the segment 110. When the upper disc 114 and the outer ring 111 move up and down relatively in an axial direction thereof, the tread mold 109 is moved in the radial direction thereof through the segment 110 so as to be enlarged and contracted. When the tread mold 109 is closed, claws 110b and 110c which are formed in the upper and lower ends of the segment 110 are engaged with claws 114b and 103a formed in the outer peripheries of the upper and lower discs 114 and 103, respectively. When the tread mold is opened, the engagement of the claws 110b and 110c with the claws 110c and 103a is released.

Reference numeral 113 denotes an upper side wall fixed onto the upper disc 114 (the upper disc 114 also serves as a heating plate with the provision of a heated and pressurized medium passage); and 116 is an upper bead ring fastened onto the upper side wall 113 by bolts.

Reference numeral 121 denotes a center post inserted into the above cylinder 120 so as to be movable vertically (slidable); 122, a bush which is integrally attached to the lower end of the center post 121 and has an outer peripheral surface that slides on the inner peripheral surface of the cylinder 120; 123, a packing which is inserted into the upper end of the cylinder 120 and has an inner peripheral surface that slides on the center post 121; and 124, a stopper for the packing 123. Inserted into a concave portion 121a formed in the lower portion of the center post 121 is automatic coupling means assembled in the tip of a rod of a center post elevating cylinder (not shown). A cap 125 is fixed to the upper end of the center post 121 through a pin 126.

Reference numeral 118 denotes a flange fastened to the cap 125 by bolts; and 117 is a bladder presser fastened to the flange 118 by bolts. The upper end of a bladder B is nipped between the outer periphery of the flange 118 and the bladder presser 117. Both ends of the bladder B approach each other or are away from each other by the operation of the above center post elevating cylinder.

It should be noted that a nozzle ring 127 having a plurality of nozzles 127a by which a heated and pressurized medium is introduced into the interior of the tire T through the bladder B is fixed onto the above cylinder 120 in which a heated and pressurized medium passage 120c that communicates with the nozzles 127a and a heated and pressurized medium exhaust passage 120d are formed. Check valve quick couplers 128 and 129 connecting those passages 120c and 120d to an external line of the mold unit are assembled in the outlet portions of the passages 120c and 120d, respectively.

Reference numeral 130 denotes a cover plate an outer periphery of which is fastened by bolts to the outer ring 111 through a spacer ring 112 and a hard heat-insulating material 131. Reference numeral 132 denotes a spacer fixed to the upper disc 114; and 119a, 119b and 119c are soft heat-insulating materials, respectively.

Locking means for the upper disc 114 and the cover plate 130 is comprised of an inner ring 138 fastened onto the upper disc 114 by bolts, an outer ring 134 rotatably assembled in the inner periphery of the cover plate 130 through the bush 133, plural pairs of claws 134a and 138a which are formed by the inner periphery of the outer ring 114 and the outer periphery of the inner ring 138 and is engageable or can pass in the axial direction thereof in accordance with a rotating angle of the outer ring 114, and a swinging unit which will be described later.

It should be noted that reference numeral 136 denotes a stopper fixed to the outer ring 134.

Reference numeral 140 shown in FIGS. 26 and 27 denotes a bolster plate fixed onto an arm 6c which is assembled in a column of the mold opening/closing unit 6a so as to be movable up and down (slidable), and moves up and down by the operation of the elevating cylinder 6d.

Reference numeral 141 denotes a known detachably attaching unit which detachably attaches the bolster plate 140 to the cover plate 130; 135, a stopper fixed onto the bolster plate 140; 142, a plurality of rods an end of which is fixed onto the bolster plate 140; 143, a mold opening/closing cylinder fastened to the other end of the rods 142 by bolts; 144, an extended rod fixed onto the tip of a rod 143a of the mold opening/closing cylinder 143; 146, a sleeve assembled in the extended rod 144 so as to be rotatable (slidable); and 145, a bush screwed to the inside of the upper end of the sleeve 146.

The coupling means for coupling the above mold opening/closing cylinder 143 to the above upper disc 114 is comprised of the extended rod 144, the bush 145, the sleeve 146, a coupling rod 139 which is integrally attached to the inner ring 138, and plural pairs of claws 139a and 146a which are formed by the outer peripheral upper portion of the coupling rod 139 and the inner peripheral lower portion of the sleeve 146 so as to be engageable or can pass in the axial direction thereof in accordance with a rotating angle of the sleeve 146.

Reference numeral 148 denotes a lever a tip of which is fork-shaped. The lever 148 is rotatably attached to the bolster plate 140 through a pin 149. A cylinder 150 is fitted between the other end of the lever 148 and the bolster plate 140 so that the lever 148 swings about the center of the pin 149 by the operation of the cylinder 150.

Reference numeral 147 denotes a rod fixed onto the arm 146c extending outward from the sleeve 146. The rod 147 is in parallel to the sleeve 146. The rod 147 is inserted into a U-shaped groove which is formed in the tip fork portion of the above lever 148, and the tip of the arm 137 is inserted into the key groove 146a which is formed in the outer periphery of the sleeve 146 in parallel to the axis. The operation of the cylinder 150 allows the lever 148 to swing so that the sleeve 146 rotates. The outer ring 134 is also rotated through the sleeve 146 and the arm 137. The rotation, when the paired claws 134a and 138a are in an engagement state, enables the paired claws 139a and 146b to pass (a release state), and when the paired claws 134a and 138a are in a passable state (a release state), makes the paired claws 139a and 146b in the engagement state.

A description will be given of the operation of the tire vulcanizer split mold unit shown in FIGS. 25 to 27, which is applied to the tire vulcanizer shown in FIGS. 23 and 24.

FIGS. 23 to 25 and 27 show a state in which the vulcanization of the tire within the tire vulcanizing mold Ma which has been mounted on the mold table 5a of the vulcanizing station 1a has been finished, and the mold Ma has been then taken in the mold opening/closing unit 6a of the mold opening/closing station 2a by the mold carrier truck 3a.

In this situation, the paired claws 134a and 138a are in the engagement state, and the paired claws 139a and 146b are in the passible state.

From this state, the cylinder 6d is first actuated to move the arm 6a down, and the detachably attaching unit 141 allows the cover plate 130 and the bolster plate 140 to be coupled to each other. Also, the heated and pressurized medium passages 120c and 120d are connected to a wiring (not shown) external to the mold through the quick couplers 128 and 129.

Subsequently, a changeover valve (not shown) is actuated in such a manner that the heated and pressurized medium is exhausted from the interior of the tire T, and after it has been confirmed that a pressure within the tire T was sufficiently lowered, the cylinder 150 is actuated so that the paired claws 139a and 146b are engaged with each other and the upper disc 114 and the rod 143a of the cylinder 143 are coupled to each other. Also, the paired claws 134a and the 138a are made in the passible state, to thereby release the lock.

Thereafter, as has been well known, the cylinder 143 is actuated in a direction toward which the upper disc 114 is pushed down, and the cylinder 6d is actuated in a direction toward which the bolster plate 140 goes up. With such operation, the tread mold 109 is peeled off from the tire T, and the diameter of the tread mold 109 is expanded. Also, the engagement of the claw 110b with the claw 114b and the engagement of the claw 103a with the claw 110c are released, respectively and the bolster plate 140 further goes up. When the cylinder 143 reaches the stroke end, the upper disc 114 is lifted up because the claw 139a is engaged with the claw 146b, to thereby open the tire vulcanizing mold.

Subsequently, the vulcanized tire T is taken out to the outside of the tire vulcanizing mold, a tire to be succeedingly vulcanized is taken in the tire vulcanizing mold, and the cylinder 6d is then actuated in a backward direction before the tire vulcanizing mold is closed. With such operation, the segment 110 hung from the upper disc 114 first abuts against the pressure plate 104, and thereafter while the cylinder 143 is moved back, the outer cylinder 110 goes down through the bolster plate 140 so that the tread mold 109 is reduced in diameter. Thus, the tire vulcanizing mold is closed.

During that operation, a pressure gas for shaping is introduced in the interior of the tire T, and the claws 110b and 103a are then engaged with the claws 114b and 110c, correspondingly, at a final stage where the diameter of the tread mold 109 is reduced.

After the tire vulcanizing mold has been closed in this manner, the actuation of the cylinder 143 is stopped, and the cylinder 150 is actuated in the backward direction so that the paired claws 134a and 138a are engaged with each other, and the cover plate 130 and the upper disc 114 are locked together. Simultaneously, the paired claws 139a and 146b are made in the passible state, and the heated and pressurized medium is introduced in the interior of the tire before advancing to a vulcanizing process.

In this situation, a force which is exerted so as to make the side wall molds 105 and 113 away from each other due to a pressure of the heated and pressurized medium is offset within the mold unit through the upper disc 114, the claws 114b, 110b, the segment 110, the claws 110c, 103a, and the lower disc 103. A force which is exerted in the radial direction so as to enlarge the diameter of the tread mold 109 is offset within the outer ring 111 through the segment 110. Simultaneously, a vertical component of the radial directional force which is caused by a slide inclined surface interposed between the segment 110 and the outer ring 111, that is, a force which is exerted so as to make the outer ring 111 float is offset within the mold unit through the spacer ring 112, the hard heat-insulating material 131, the cover plate 130, the outer ring 134, the claws 134a, 138a, the inner ring 138, the upper disc 114, and the claws 114b and 110b.

Hence, it is needless to hold the mold unit by an external force through the bolster plate 140. The detachably attaching unit 141 is released, and the cylinder 6d is actuated so that the arm 6c goes up before the mold unit is moved at a predetermined position of the vulcanizing station in the procedure reverse to the above-mentioned procedure. Then, the vulcanization is continued.

Subsequently, the tire vulcanizer of the foregoing item (2) will be described with reference to FIGS. 28 to 34. Similarly as shown in FIGS. 23 and 24, this tire vulcanizer is also equipped with vulcanizing stations 1 (1a and 1b), a plurality of mold tables 5a, 5b, 5c, . . . , a plurality of tire vulcanizing molds Ma, Mb, Mc, . . . , mold opening/closing stations 2 (2a and 2b), mold opening/closing units 6a and 6b, mold carrier trucks 3a and 3b (13a and 13b), and a mold exchange station 11.

Now, the tire vulcanizing mold M will be described with reference to FIGS. 28 to 34. It should be noted that the left side of a line d—d in FIG. 28 shows a state of the tire vulcanizing mold after the tire vulcanizing mold M has been opened and a vulcanized tire has been taken out whereas the right side thereof shows a state of the tire vulcanizing mold in which after an unvulcanized tire T has been taken into the mold, the tire vulcanizing mold has been closed, and the heated and pressurized medium has been introduced into the interior of the tire T to start the vulcanization.

Reference numeral 201 denotes a substrate of the tire vulcanizing mold M, and the substrate 201 is horizontally slidably mounted on a frame 6e of a mold opening/closing unit 6a through a ball caster 202 embedded below the lower surface of the substrate 201. The substrate 201 is fitted onto the frame 6e by a known lock unit (not shown).

A lower heating plate 203 is fixed onto a bush 208 which has been inserted so as to be vertically slidable with a guide of the outer peripheral surface of a cylindrical portion 201a which is formed in the center portion of the substrate 201. A rod of a cylinder 6f fixed onto the frame 6e penetrates a hole 201e defined in the substrate 201. With the vertical movement of that rod, the lower heating plate 203 goes up and down.

Reference numeral 205 denotes a lower side wall mold which is fastened onto the lower heating plate 203 by bolts, and 206 is a lower bead ring assembled in a bush 208 with a known bayonet lock mechanism. The lower end portion of a bladder B is nipped between a bladder presser 207 fastened onto the lower bead ring 206 by bolts and the lower bead ring 206.

Reference numeral 209 denotes a tread mold which is divided into a plurality of pieces in the peripheral direction. When the tread mold 209 is closed, the tread mold 209 is fastened by volts onto the inner peripheral surface of a plurality of segments 210 the outer peripheral surface of which forms a practical conical surface. An outer ring 211 having in the periphery thereof a conical surface which is engaged with the outer peripheral surface of the segments 210 is fastened onto the substrate 201 through a spacer 212 by bolts. A T-bar 211a, which is slidably engaged with a T-groove 210a formed vertically in the conical outer peripheral surface of the segments 210, is fixed onto the conical peripheral surface of the outer ring 211. When the lower heating plate 203 goes up by the action of the foregoing cylinder 6f, the segments 210 are pushed up through the pressure plate 204 fitted onto the lower heating plate 203 and also slid outwardly in the radial direction while being guided by the T-bar 211a so that the tread mold 209 is away outwardly in the radial direction relatively with respect to the lower side wall mold 205. The claw 210b formed in the lower portion of the segments 210 is moved outwardly in the radial direction relatively with respect to the claw 203a formed in the outer periphery of the lower heating plate 203, which is engaged with the claw 210b when the mold is closed, so that the engagement is released.

An upper heating plate 214 onto which a pressure plate 215 is fitted, when the tire vulcanizing mold M is closed, is mounted on the segments 210 through the pressure plate 215. A claw 214a formed in the upper heating plate 214 and a claw 214c formed in the upper portion of the segment 210 are engaged with each other or released from engagement by the sliding of the segments 210 in the radial direction.

Reference numeral 213 denotes an upper side wall mold fastened onto the upper heating plate 214 by bolts, and 216 is an upper bead ring fastened onto the upper side wall mold 213 by bolts.

It should be noted that the tip of a rod of the cylinder 6d which is attached onto the frame 6e is fitted onto the arm 6c assembled in the frame 6a so as to be vertically movable, and the arm 6c moves vertically with the actuation of the cylinder 6d.

Also, a known detachably attaching means 6k for enabling the upper heating plate 214 to be detachably attached to the arm 6c, that is, a rotary cylinder 224 is fixed onto the other end of a T-rod 225 which is integrated with a claw 225a at a tip thereof so as to be T-shaped. The actuation of the rotary cylinder 224 allows the T-rod 225 to reciprocatingly rotate by 90 degrees. A means engageable or passable with respect to a claw 214b which is integrated with the upper heating plate 214 is assembled in the arm 6c. When the cylinder 6d is actuated while the detachably attaching means 6k couples the arm 6c to the upper heating plate 214 and the engagement of the claw 210c with the claw 241a is released with the outward movement of the segments 210 in the radial direction, then the upper side wall mold 213 and the upper bead ring 216 move vertically together with the upper heating plate 214.

A second center post 221 is vertically slidably inserted into the inner peripheral surface of a bush 220 as a guide, which is fastened by bolts to the upper end portion of the cylindrical portion 201a of the substrate 201. Also, a first center post 123 is vertically slidably inserted into the inner peripheral surface of a bush 222 as a guide, which is fastened by bolts to the upper end portion of the second center post 221. An extension rod 6j is screwed to the tip of the rod of a center post elevating cylinder (not shown) fitted onto the frame 6e. A claw 6i is formed on the upper end of a cylinder 6b which is rotatably assembled in the extension rod 6j. A claw 223c is formed on the lower end of the first center post 223. The first center post 223 moves vertically with the engagement of the extension rod 6j as well as the claw 6i with the claw 223c.

With the first center post 223 moving up, a flange 223b formed on the lower portion of the first center post 223 abuts against a ring-shaped projection 221b which is formed in the interior of the upper portion of the second center post 221. As a result, the second center post 221 goes up, and a flange 221a formed on the lower end of the second center post 221 abuts against a ring-shaped projection 201c formed in the interior of the upper portion of the cylinder 201a so that the going-up of the first and second center posts 221 and 223 is stopped. When they go down, the outer peripheral end of the bush 222 abuts against the bush 220 so that the going-down of the second center post 221 is stopped. Then, a flange 218 fastened to the upper end of the first center post 223 by bolts abuts against the bush 222 with the result that the going-down of the first center post 223 is also stopped.

The upper end of the bladder B is nipped between the flange 218 and the bladder presser 217 which is fastened to the flange 218 by bolts. The upper and lower ends of the bladder B are away from each other or approach each other in accordance with the vertical movement of the center post 223.

Also, at the cylindrical portion 201a of the substrate 201, a passage 201b for supplying or exhausting the heated and pressurized medium is disposed in the interior of the tire T through the bladder B. The lower end of the passage 201b is so designed as to be detachably attached through a piping 6g of the mold opening/closing unit 6.

That is, the detachably attaching means 226 is comprised of a check valve and a piping 6g. The check valve consists of a valve body 227 fixedly embedded in the substrate 201, a valve 228 which slides on one inner peripheral surface 227b of the valve body 227 as a guide and has a seat surface 227a that is engaged with a seat 227a formed in the middle of the valve body 227, and a coil spring 229 pushing the valve 228 onto the seat 227a. The piping 6g has a cylindrical surface which is slidably engaged with the other inner peripheral surface 227c of the valve body 227 in the outer periphery of a tip thereof. A Y-shaped body which abuts against a valve spindle 228c of the valve 228, extending toward the side of the seat surface 227a is formed in the tip of the piping 6g. When the piping 6g is inserted into the valve body 227, the valve 228 is pushed up so that the passage 201b communicates with the piping 6g. When the piping 6g is lowered, the valve 228 is pushed down by the coil spring 229 in such a manner that the passage 201b is closed. It should be noted that a changeover valve (not shown) and so on are assembled between the piping 6g and the heated and pressurized medium supply source.

Also, the first center post 223 is equipped with a passage 223a for introducing a vapor for shaping and so on into the interior of the tire T through a bladder B. Similarly, a detachably attaching means like the above is assembled under the passage 223a.

The operation of the tire vulcanizer shown in FIGS. 28 to 34, which is applied to the tire vulcanizer showing in FIGS. 23 and 24 will be described below.

In the tire vulcanizer shown in FIGS. 23 and 24, the vulcanization of a tire within the tire vulcanizing mold Ma which has been mounted on the mold table 5a in the vulcanizing station 1a is finished, and after the mold carrier truck 3a finished taking the mold into the mold opening/closing unit 6a of the mold opening/closing station 2a, the cylinder 6d is actuated to go the arm down so that the detachably attaching means 6k allows the upper heating plate 214 of the tire vulcanizing mold Ma to be coupled with the arm 6c. Simultaneously, the piping 6g is lifted up so as to communicate with the communication 201b. The extension rod 6j is lifted up a little so as to communicate with the passage 223a, and the cylinder 6h is rotated in such a manner that the claws 6j and 223c are engaged with each other.

Subsequently, the changeover valve (not shown) is actuated to exhaust the heated and pressurized medium within the tire T. After it has been confirmed that the inner pressure in the tire T is satisfactorily lowered, the cylinder 6f is actuated to push up the lower heating plate 203. With this push-up operation, the tread mold 209 is away relatively from the tire T to perform mold release. After the tread mold 209 is sufficiently enlarged in diameter in such a manner that the engagement of the claws 210b and 210c of the segment 210 with the claws 203a and 214a of the upper and lower heating plates is released, the cylinder 6d is actuated to make the upper heating plate 214 go up, thereby performing the mold release of the upper side wall mold 213. While the interior of the bladder B is made vacuous through the passage 223a, the center post 223 is allowed to go up so that the bladder B is drawn out from the interior of the tire T.

Subsequently, the unloader 7a operates to make the vulcanized tire T hung out to the exterior of the tire vulcanizing mold Ma, and the loader 8a operates to make an unvulcanized tire T to be succeedingly vulcanized hung into the tire vulcanizing mold Ma. While vapor for shaping is supplied into the bladder B through the passage 223a, the center post 223 is allowed to go down. Then, after the bladder B has been inserted into the interior of the unvulcanized tire T which has been hung into the mold, the loader 8a releases the gripping of the tire T and is then moved to a stand-by position. After the loader 8a has been moved to a position where it does not interfere with the upper heating plate 214, the cylinder 6d is actuated to make the upper heating plate 214 go down, thereby performing shaping and tire vulcanizing mold opening/closing processes in a known procedure. After the upper heating plate 214 abuts against the segment 210, the cylinder 6g is also actuated to make the upper heating plate 214 push down the lower heating plate 203 through the segment 210. With this push-down operation, the tread mold 209 is reduced in diameter whereby the tire vulcanizing mold Ma is closed.

In this situation, the engagement of the claws 210c and 214a as well as the engagement of the claws 203a and 210b is conducted simultaneously. Therefore, after the tire vulcanizing mold Ma has been closed, the heated and pressurized medium is introduced into the interior of the tire T through the bladder B to thereby start the vulcanization. Even in such a situation, a force which is exerted to open the mold as a result of a pressure of the heated and pressurized medium is offset through the segment 210 with the engagement of the claws 210c and 214a, and the claws 203a and 210b. As a result, the mold is not allowed to open.

Then, after the vulcanization of the tire starts, the coupling of the tire vulcanizing mold Ma to the mold opening/closing unit 6a is released in a procedure reverse to the foregoing procedure. In this situation, since the check valve is assembled in the lower end portions of the passages 223a and 201b, the inside pressure in the tire is held.

Subsequently, the tire vulcanizing mold Ma is transported onto the mold table 5a of the vulcanizing station 1a by the mold carrier truck 3a, and the vulcanization is continued. The mold carrier truck 3a then receives the tire vulcanizing mold by which vulcanization has been finished and transports that mold to the mold opening/closing station 2a.

It should be noted that in the case of conducting the exchange of the bladder B and so on, after the mold is closed once without hanging the tire T to be succeedingly vulcanized into the mold (in this case, it goes without saying that the heated and pressurized medium is not introduced), the tire T is transported to the mold exchange station 11. While the bladder B, etc. are exchanged, the tire is taken in or taken out from another tire vulcanizing mold in the mold carrier truck 3a and the mold opening/closing station 6a. After the exchange of the bladder B, etc. has been finished, the mold is carried to the mold opening/closing station so that a tire to be succeedingly vulcanized is inserted into the mold.

The tire vulcanizing split mold unit shown in FIGS. 23 to 27 and the tire vulcanizer shown in FIGS. 28 to 34 suffer from the following problems. That is, (a) When a complete tire is taken out from the mold opened and an unvulcanized tire is installed into the mold, it is necessary to extend the bladder B. Accordingly, the center post must be extended.

(b) The mold opening/closing stations 2a and 2b shown in FIGS. 23 and 24 is of the stationary type. When the mold is opened, because the upper mold is on standby above the lower mold, for the purpose of making the unloader 7a which takes out the complete tire as well as the loader 8a which supplies the complete tire inserted between the foregoing upper and lower molds, a stroke of the cylinder 6d of the foregoing mold opening/closing stations 2a and 2b must be increased so that an interval between the upper and lower molds is made long.

For that reason, the height of the mold opening/closing stations 2a and 2b is heightened regardless of the fact that the height of the upper portion of the vulcanizing stations 1a and 1b can be lowered. Therefore, the height of the mold opening/closing stations 2a and 2b must be lowered.

(c) When the unvulcanized tire is to be supplied using an upper space of the foregoing vulcanizing stations 1a and 1b, a tire supply unit is required to be inserted between the upper and lower molds at a still higher position, which leads to a problem as to the height of the mold opening/closing stations 2a and 2b, likewise.

Further, the foregoing vulcanizer is equipped with each pair of the unloader for taking out the complete tire and the loader for supplying the unvulcanized tire. However, the provision of each pair of the unloader for taking out the complete tire and the loader for supplying the unvulcanized tire is economically disadvantageous regardless of the fact that the upper bead portions of the tire and unvulcanized tire are gripped from the inside, and the basic function such as the going up and down between appropriate positions or the sliding between the appropriate positions is the same.

(d) Furthermore, the application of the tire vulcanizer shown in FIGS. 23 and 24 to the tire vulcanizer which is short in the vulcanization period of time (for example, 8 to 10 minutes) suffered from a variety of problems stated below. In other words, the tire mold carrier truck 3a receives the tire mold at the vulcanizing stations 1a and 1b before the work in the mold opening/closing stations 2a and 2b is completed. A period of time until the closed tire mold is moved back to the vulcanizing stations 1a and 1b again is made as short as possible, thereby needing to improve the productivity. However, in the foregoing tire vulcanizer, because the number of molds which constitute the tire vulcanizer cannot be increased, the productivity cannot be improved.

Also, it is preferable to average a period of time necessary for the transportation of each tire mold from the standpoint of the running management such that a tire mold which has become unnecessary during the running is taken out, or a new tire mold is squeezed into a system running instead of the taken-out tire mold. In other words, it is preferable to make the transportation time nearly identical between a tire mold which is close to the mold opening/closing stations 2a and 2b and a tire mold which is far therefrom.

Also, the heated and pressurized medium which is introduced into the interior of the tire after the tire mold is closed in the mold opening/closing stations 2a and 2b is temporarily sealed during transportation. After arrival to the vulcanizing stations 1a and 1b, the heated and pressurized medium is again supplied. A period of time when the heated and pressurized medium is being temporarily sealed is preferably as short as possible from the standpoint of the management of the tire quality.

In the case of the continuous production due to the vulcanizer, an unvulcanized tire must be supplied without any discontinuation of the unvulcanized tire. It is necessary that the unvulcanized tires as much as possible are stored in the vicinity of a loader unit disposed in the mold opening/closing stations 2a and 2b, and that a new unvulcanized tire is sequentially supplied. Also, in the case of a tire for an automobile, etc., a cooling unit for the vulcanized tire is required, and the cooling unit for a vulcanized tire must be located in the vicinity of the unloader unit 7a which is disposed in the mold opening/closing stations 2a and 2b.

SUMMARY OF THE INVENTION

The present invention has been proposed in response to the foregoing problems, and therefore an object of the invention is to provide a tire vulcanizer advantageous economically which is capable of 1) eliminating an interference with a plant house which is a problem caused in a conventional vulcanizer, 2) saving an occupied plane space, 3) performing the supply of the vulcanized tire by a single handling unit, and 4) efficiently performing the production of a tire and facilitating the quality management of the tire.

In order to solve the foregoing problems, the present invention has been achieved by the provision of a tire vulcanizer which includes a vulcanizing station where plural sets of tire vulcanizing molds are arranged to perform vulcanization, a mold opening/closing station where said tire vulcanizing mold is opened, a vulcanized tire is taken out from the inside of said tire vulcanizing mold, an unvulcanized tire to be succeedingly vulcanized is inserted into the inside of said tire vulcanizing mold and shaped, and then said tire vulcanizing mold is closed, and a mold carrier truck which is movable between said vulcanizing mold and said mold opening/closing station, wherein an unvulcanized tire storage section is disposed above each of said tire vulcanizing molds in said vulcanizing station.

Also, the present invention has been achieved by the provision of a tire vulcanizer which includes a vulcanizing station where plural sets of tire vulcanizing molds are arranged to perform vulcanization, a mold opening/closing station where said tire vulcanizing mold is opened, a vulcanized tire is taken out from the inside of said tire vulcanizing mold, an unvulcanized tire to be succeedingly vulcanized is inserted into the inside of said tire vulcanizing mold and shaped, and then said tire vulcanizing mold is closed, and a mold carrier truck which is movable between said vulcanizing mold and said mold opening/closing station, wherein said mold opening/closing unit of said mold opening/closing station is constituted so as to be movable vertically and so as to be movable to a refuge position while the take-out of a vulcanized tire and the take-in of an unvulcanized tire are conducted.

Further, according to the present invention, the tire vulcanizer may include a tire handling unit which is moved between three respective positions consisting of a tire take-out position, an unvulcanized tire receiving position and a supply position at which an unvulcanized tire is supplied to the tire vulcanizing mold, for performing the take-out of the vulcanized tire and the supply of the unvulcanized tire.

Still further, the present invention has been achieved by the provision of a tire vulcanizer which includes a vulcanizing station where plural sets of tire vulcanizing molds are arranged to perform vulcanization, a mold opening/closing station where said tire vulcanizing mold is opened, a vulcanized tire is taken out from the inside of said tire vulcanizing mold, an unvulcanized tire to be succeedingly vulcanized is inserted into the inside of said tire vulcanizing mold and shaped, and then said tire vulcanizing mold is closed, and a mold carrier truck which is movable between said vulcanizing mold and said mold opening/closing station, wherein a vulcanized tire cooler and an unvulcanized tire supply equipment are located in a space above said vulcanizing station.

Still further, according to the present invention, the tire vulcanizer may include rails disposed on a base of said vulcanized tire cooler, along which the truck travels, an assembly opening/closing unit disposed in the vicinity of said rails, and an assembly gripping unit disposed on said truck, for gripping individually assemblies which are positioned at both sides of said rails and consist of plural sets of vulcanized tires and cooling rims, to reciprocate to said assembly opening/closing unit.

Still further according to the present invention, the tire vulcanizer may include a plurality of unvulcanized tire support tables disposed on the base of said unvulcanized tire supply equipment, rails, along which the truck travels, located on the base between said unvulcanized tire support tables, and a tire, gripping unit disposed on said truck, for gripping the unvulcanized tire at the unvulcanized tire receiving position to supply the gripped unvulcanized tire to an empty support table portion of the tire support tables and for gripping the unvulcanized tire on the tire support table to transport the gripped unvulcanized tire to an unvulcanized tire sweep-away table.

Still further, according to the present invention, the tire vulcanizer may include a manipulating mechanism for a bladder in the interior of the tire mold and a supply/exhaust mechanism for the heated and pressurized medium into or from the bladder, which are disposed on said tire mold carrier truck.

An outline of the tire vulcanizer thus constituted according to the present invention can be given overall.

The upper space in the vulcanizing station can be used for the storage and supply of the unvulcanized tire, resulting in no necessity of providing an unvulcanized tire supply table and a parking of the unvulcanized tire carrier truck, etc., in front of the tire vulcanizer, which have been required by the conventional tire vulcanizer. As a result, the occupied plane space can be saved.

The open/close stroke of the mold opening/closing unit is reduced, and the mold opening/closing unit is lowered in the overall height in combination with the lateral movement, to thereby eliminate an interference with a plant house which is a problem caused in the conventional tire vulcanizer.

The take-out conveyor of a complete tire can be located on the upper portion of the vulcanizing station, from the standpoint of which a space can be saved.

The take-out of the complete tire and the supply of an unvulcanized tire are conducted by a single handling unit, which is advantageous economically.

Also, the typical operation progresses as follows.

(1) The tire mold by which vulcanization has been finished in the vulcanizing station is transported to the mold opening/closing station through the tire mold carrier truck.

(2) The upper mold portion of the transported tire mold is coupled to the mold coupling unit of the mold opening/closing unit, and then lifted up to open the tire mold.

(3) During the foregoing operation, the lower mold portion allows the vulcanized tire to be peeled off from the lower mold portion, and the vulcanized tire to be peeled off from the bladder. Subsequently, after the unloader inserted between the upper and lower mold portions, it is allowed to go down so as to grip the vulcanized tire placed on the lower mold. Then, the unloader is allowed to go up to take out the tire.

(4) After the unloader has been moved to a position where the unloader does not interfere with other components, a loader which has been on standby while gripping the unvulcanized tire is allowed to enter the mold. Thereafter, the loader is allowed to go down in such a manner that the unvulcanized tire is placed on the lower mold portion, and releases the unvulcanized tire. Then, the loader is returned to the original position.

(5) After the loader has been moved to a position where the loader does not interfere with other components, the upper mold portion is allowed to go down. Then, the mold is shaped, and the tire molding is closed. After the tire mold has been closed, the heated and pressurized medium is supplied to the interior of the tire.

(6) The coupling of the upper mold portion of the tire mold to the mold opening/closing unit is released, and the mold opening/closing unit is lifted up to a position where it does not obstruct the movement of the tire mold.

(7) The tire mold carrier truck makes the foregoing tire mold return to the original position. Then, the supply of the foregoing heated and pressurized medium is temporarily interrupted immediately before the tire mold is moved from the tire mold carrier truck to the vulcanizing station side so that the heated and pressurized medium is charged into the tire. After the tire mold has been moved to the vulcanizing station side, the supply of the heated and pressurized medium is restarted.

(8) The tire mold carrier truck which has delivered the tire mold to the vulcanizing station is moved to a tire mold position to be succeedingly transported, and the foregoing work is repeatedly performed.

(9) The vulcanized tire which has been taken out in the foregoing process (3) is supplied to the opening/closing units of the tire cooler. Before the tire is supplied to the opening/closing units, an assembly (cooling unit) corresponding to the tire mold is gripped by the gripping unit of the truck so as to be located, for example, upon the reception of a vulcanization end signal in the vulcanizing station. Then, the gripping unit stands by at a position where it does not interfere with the operation of the opening/closing unit. The opening/closing unit allows the engagement of the upper and lower rims of the assembly (cooling unit) to be released, and the upper rim side to be lifted up so that the tire and the lower rib portion remain down. Thereafter, the foregoing gripping unit is inserted between the upper rim and the tire located on the lower rim so as to grip the tire. The truck is moved together with the tire and then takes out the tire. After the tire has been taken out, the truck is returned to the opening/closing unit again and is made standby. The opening/closing unit waits for the take-out of the vulcanized tire from the tire mold with the upper rim portion of the cooling unit being at the upper position and the lower rim portion thereof being at the lower position. This vulcanized tire is allowed to be inserted between the upper and lower rims while it is gripped by the unloader, and then delivered. Subsequently, the unloader leaves therefrom and is moved to a position $P_1$. At an appropriate timing after the unloader has left, the upper rim portion is allowed to go down, and the upper and lower rims are engaged with each other so that a predetermined air pressure is charged into the tire. After the air pressure has been charged, the coupling of the cooling unit to the opening/closing unit is released, and the foregoing gripping unit which has been on standby grips the cooling unit, transports the unit to the original position of the cooling unit, and places it thereon softly. Thereafter, the gripping unit starts like works upon the reception of a signal representative of a vulcanization end from the opening/closing station side.

(10) An operation before and when gripping the unvulcanized tire by the loader in the foregoing process (4) will be described. Upon the reception of the vulcanization end signal from the vulcanizing station, the unvulcanized tire corresponding to the foregoing tire mold is gripped by the take-out unit so as to be placed on the tire sweep table. The unvulcanized tire sweep table to which the unvulcanized tire is delivered is moved to a position below the loader of the mold opening/closing unit before being stopped. The loader is allowed to go down to grip the unvulcanized tire. Then, the tire sweep table stands by until the completion of a predetermined operation in the mold opening/closing unit and enters at an appropriate timing so that the unvulcanized tire is placed on the lower mold portion. The foregoing take-out unit, after the delivery of the tire to the sweep table, performs a work for moving to receive the unvulcanized tire to be succeedingly vulcanized, or a work for pulling out the tire supplied onto the tire receiving table to transfer it to an empty support table.

As mentioned above, the transportation of the mold where vulcanization has been finished, the opening/closing of the mold, the take-out of the vulcanized tire, the handling of the cooling unit, the take-in of the unvulcanized tire, and the preparation and supply of the unvulcanized tire are conductible appropriately.

BRIEF DESCRIPTION OF THE DRAWINGS

The accompanying drawings, which are incorporated in and constitute a part of this specification, illustrate (an) embodiment(s) of the invention and, together with the description, serve to explain the objects, advantages and principles of the invention. In the drawings.

DETAILED DESCRIPTION OF THE PREFERRED EMBODIMENTS

Figure 1:
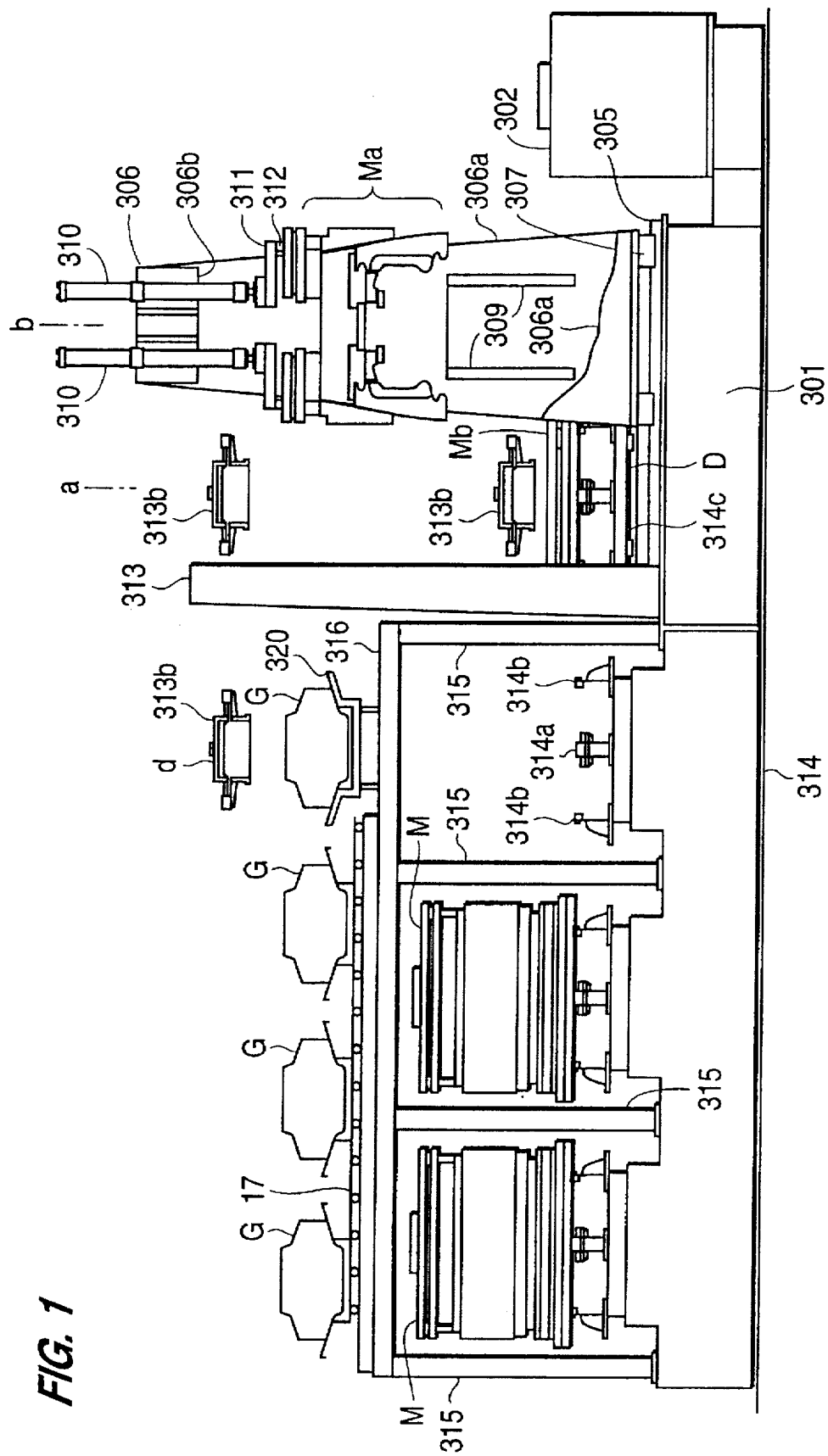
FIG. 1 is a front view showing a tire vulcanizer in accordance with one embodiment of the present invention.
Figure 2:
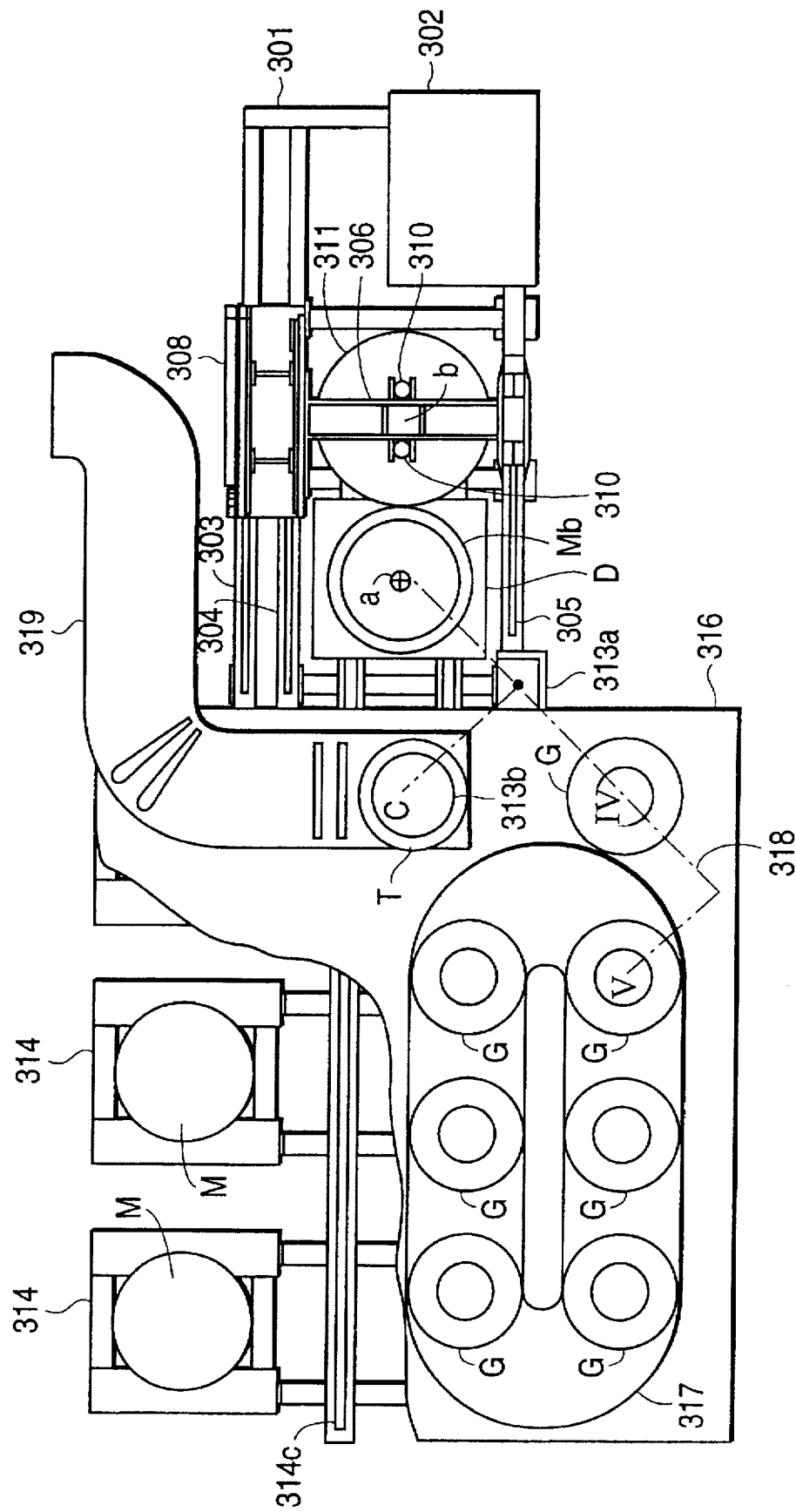
FIG. 2 is a plan view showing the tire vulcanizer shown in FIG. 1.

Now, a description will be given of a tire vulcanizer in accordance with the present invention with reference to FIGS. 1 and 2 showing a first embodiment.

Figure 3:
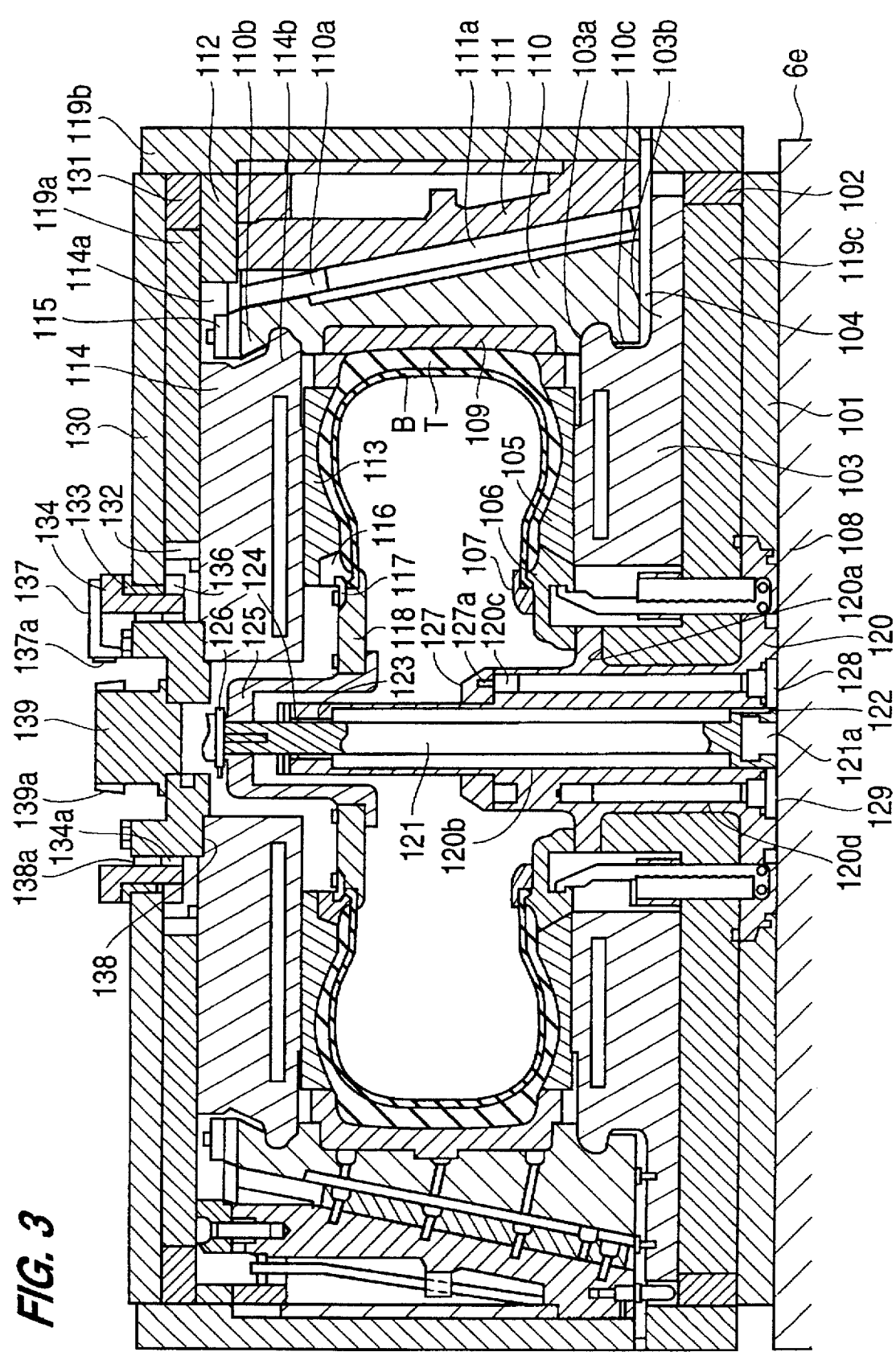
FIG. 3 is a vertical cross-sectional side view showing one example of a slit mold unit used in the tire vulcanizer.
Figure 4:
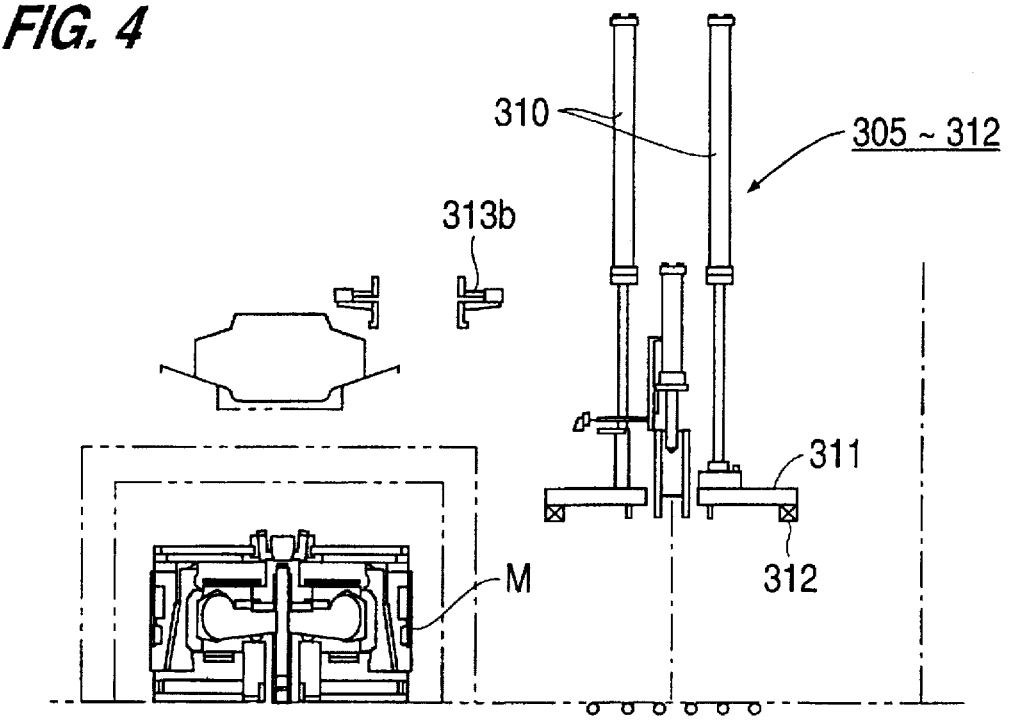
FIG. 4 is a diagram explanatorily showing the operation of the tire vulcanizer.
Figure 5:
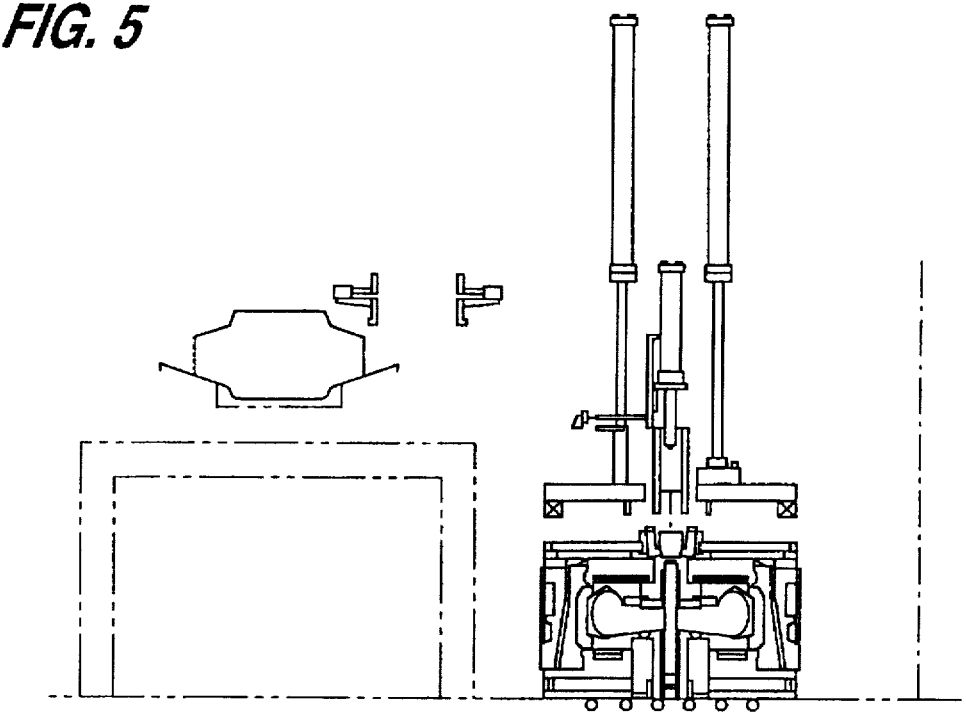
FIG. 5 is a diagram explanatorily showing the operation of the tire vulcanizer.
Figure 25:
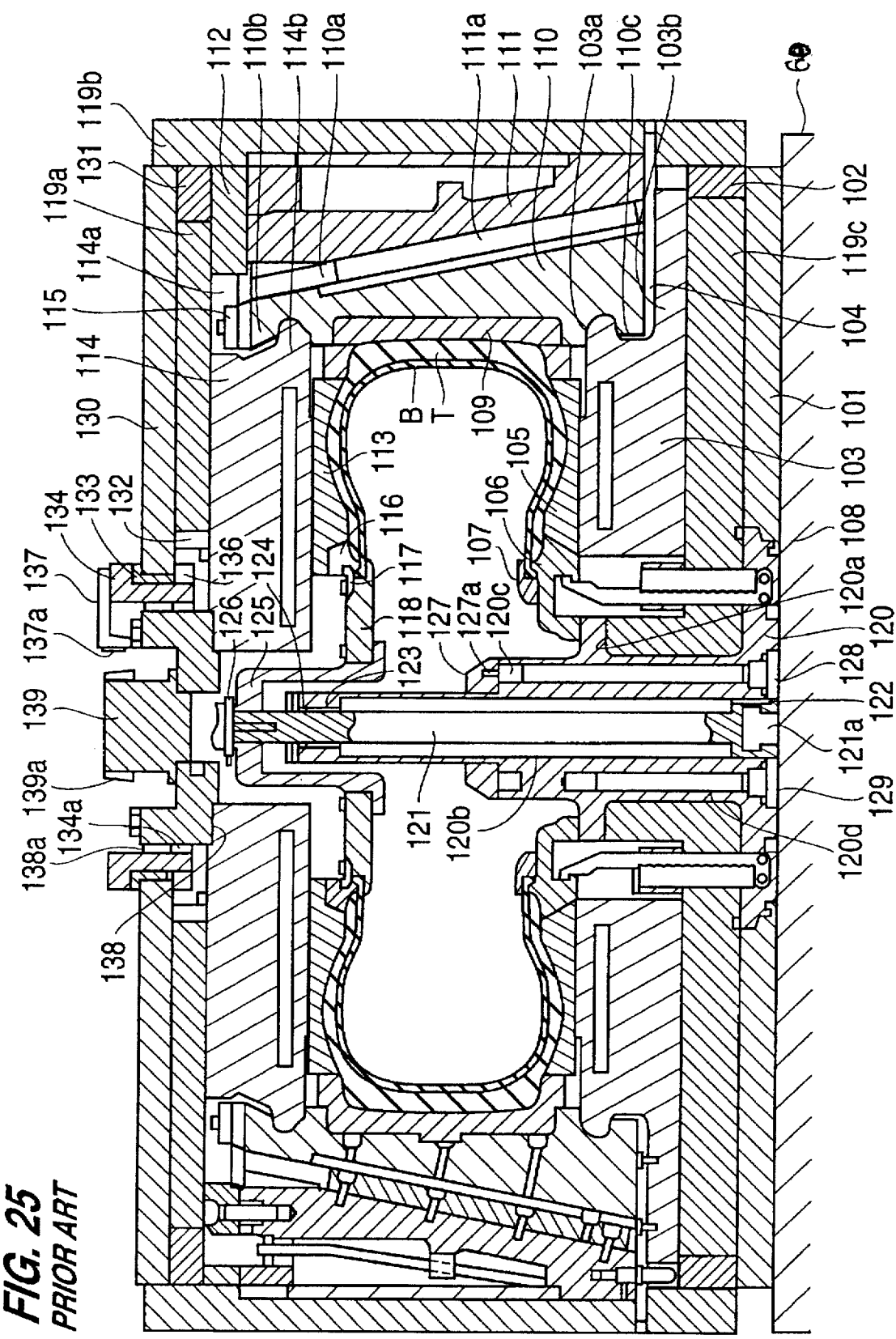
FIG. 25 is a vertical cross-sectional side view showing a tire vulcanizer split mold unit taken along the line 25—25 in FIG. 24.
Figure 26:
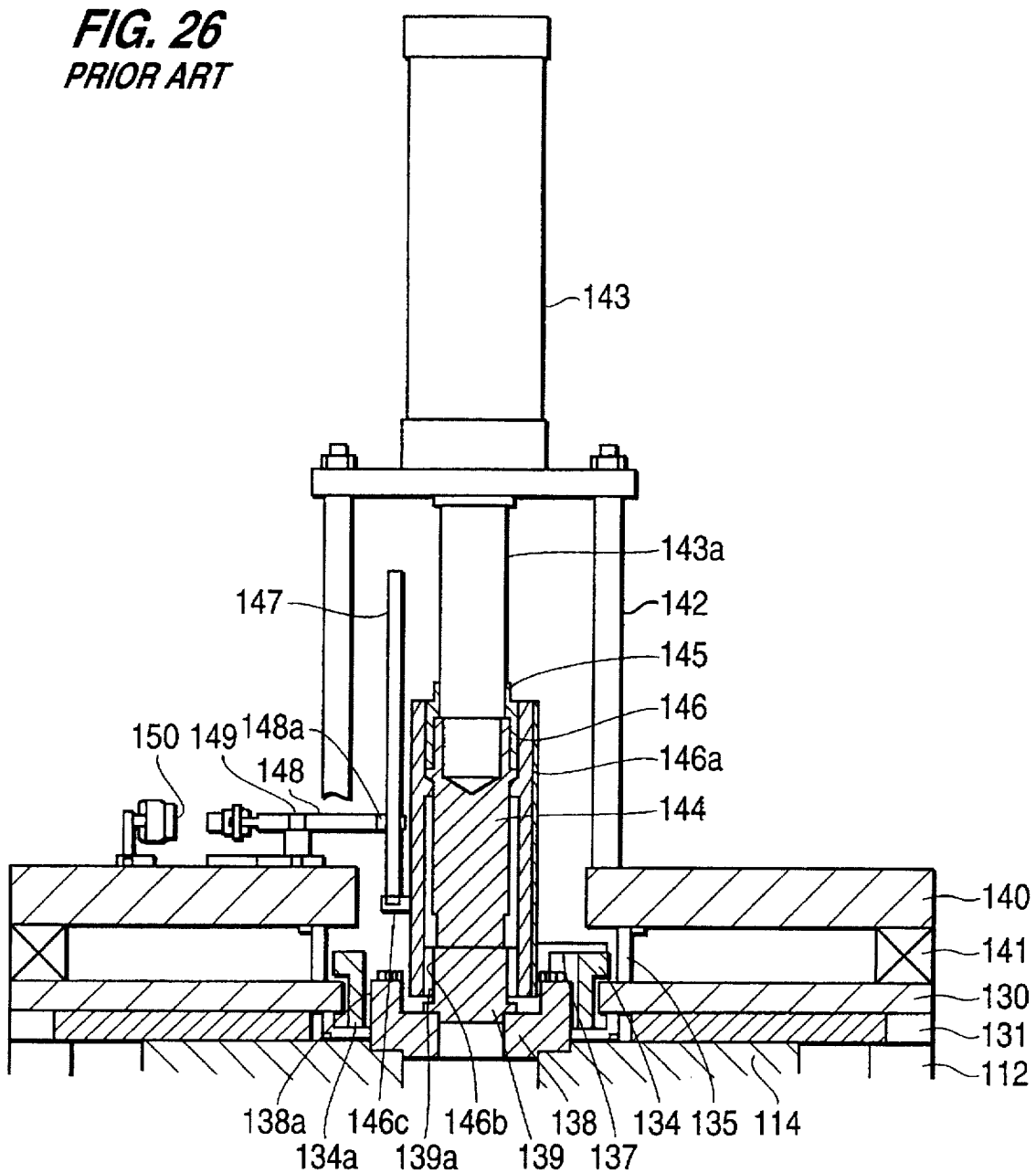
FIG. 26 is a vertical cross-sectional front view showing one example of the tire vulcanizer split mold unit and a mold opening/closing unit.
Figure 27:
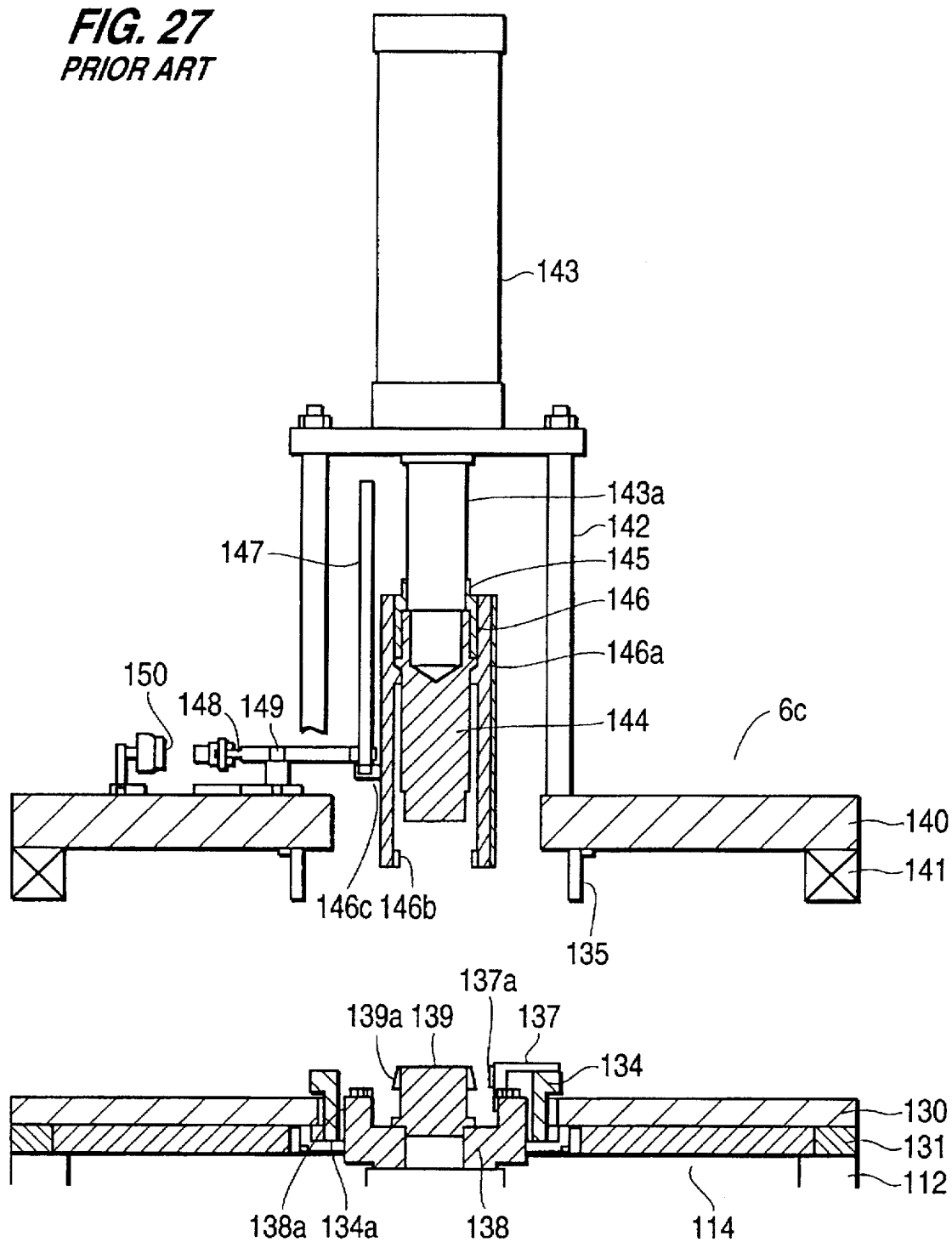
FIG. 27 is a vertical cross-sectional front view showing another example of the tire vulcanizer split mold unit and a mold opening/closing unit.
Figure 28:
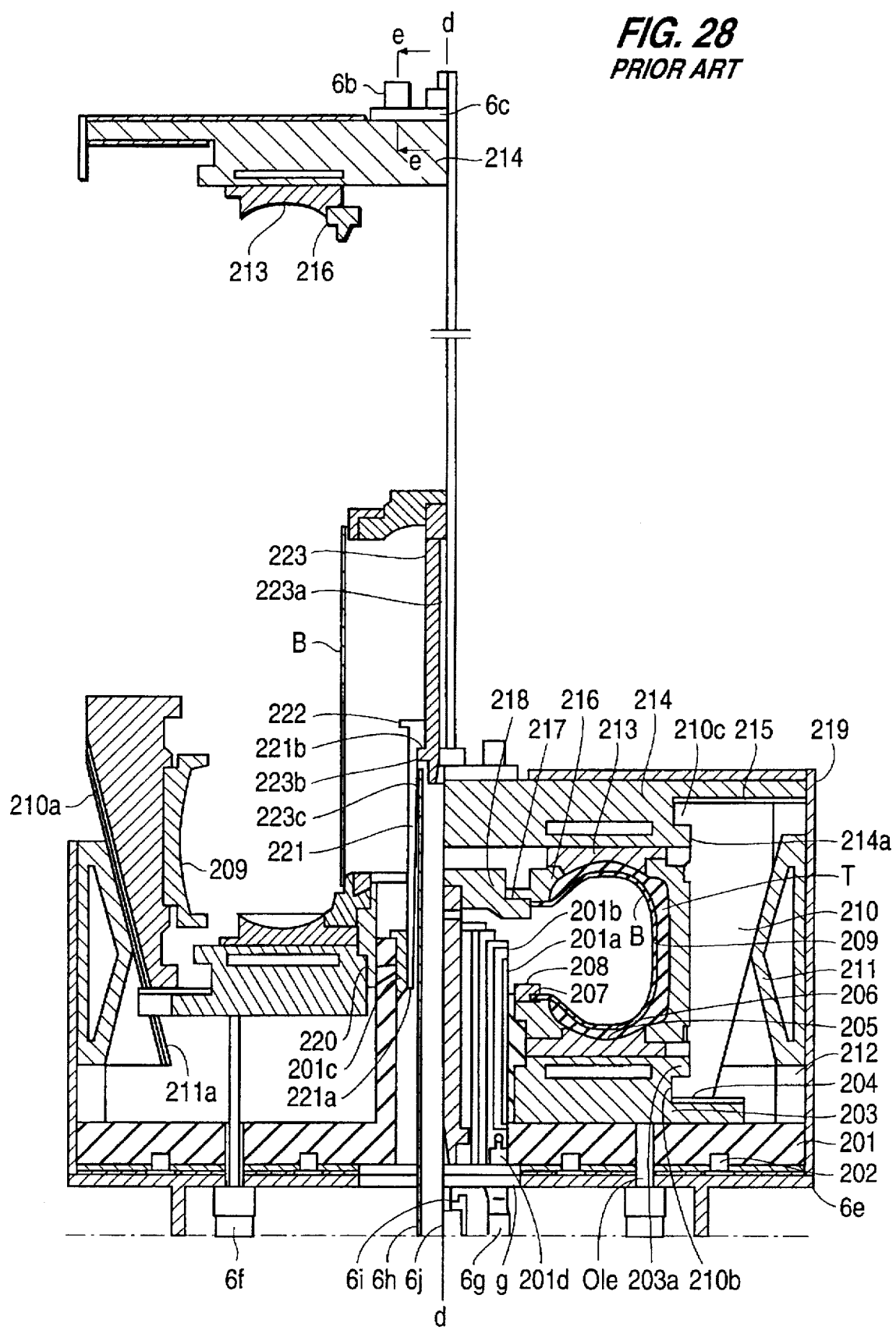
FIG. 28 is a plan view showing another prior art tire vulcanizer.
Figure 29:
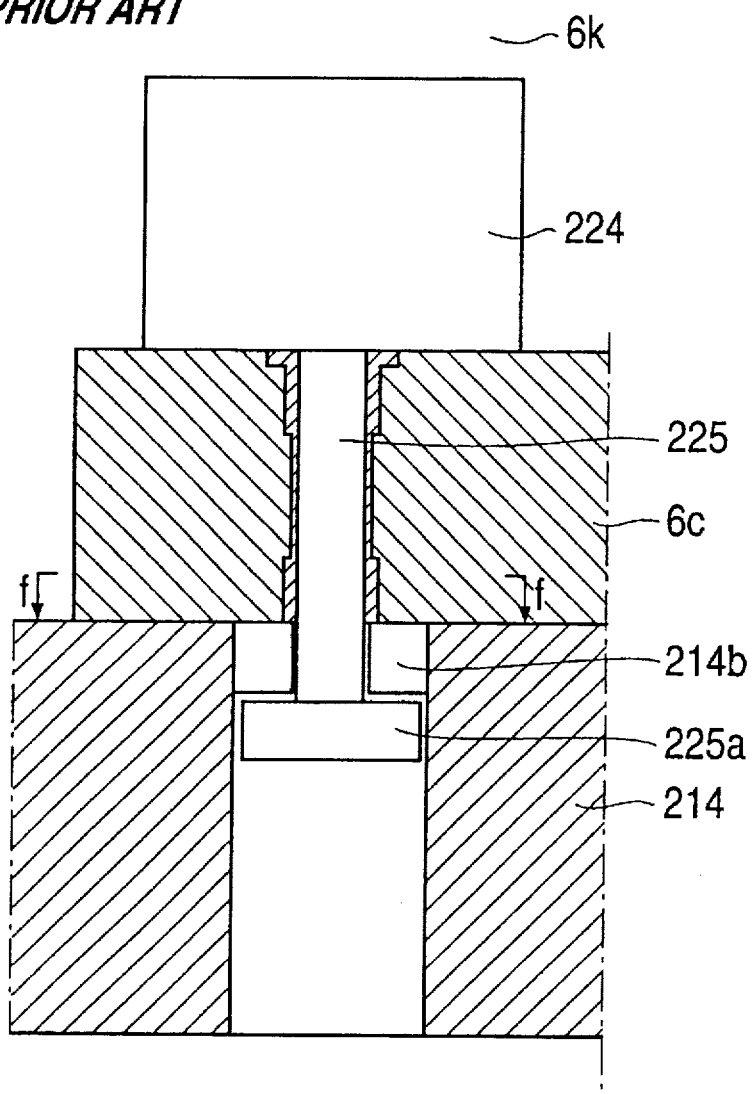
FIG. 29 is a vertical cross-sectional side view of the tire vulcanizer taken along the line e—e in FIG. 28.
Figure 30:
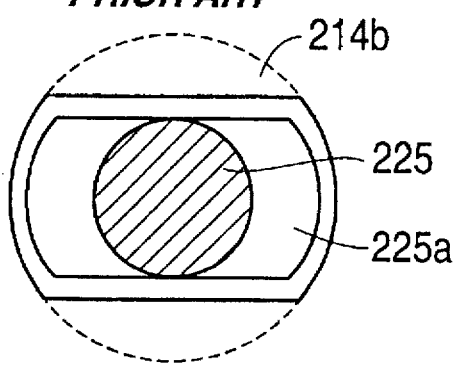
FIG. 30 is a lateral cross-sectional plan view showing one example of an upper heating plate detachably attaching means.
Figure 31:
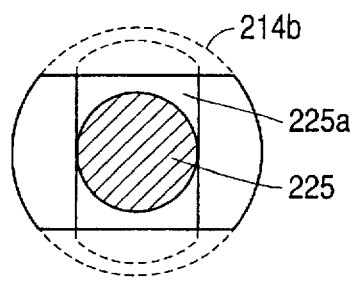
FIG. 31 is a lateral cross-sectional plan view showing another example of an upper heating plate detachably attaching means.
Figure 32:
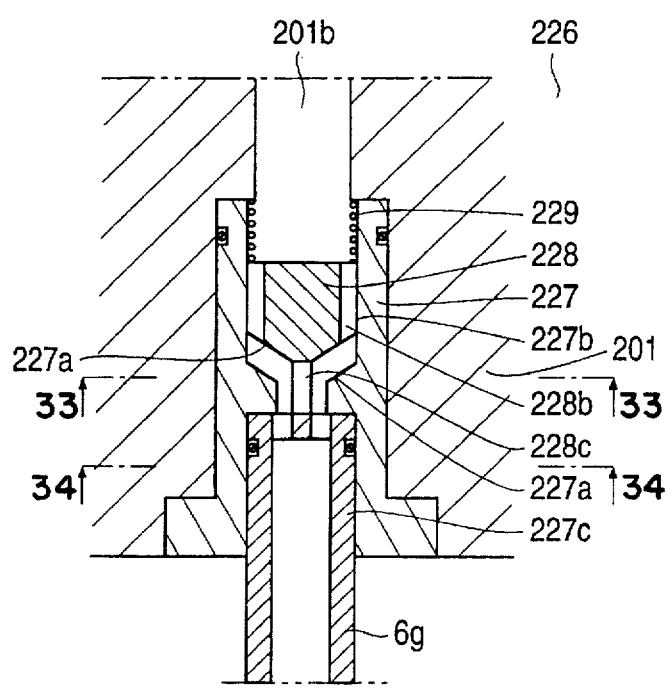
FIG. 32 is an enlarged vertical cross-sectional side view showing a portion indicated by an arrow g in FIG. 28.
Figure 33:
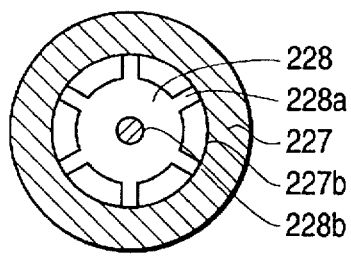
FIG. 33 is a horizontal cross-sectional plan view showing the tire vulcanizer taken along the line 33—33 in FIG. 32.
Figure 34:
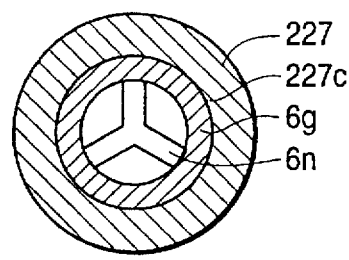
FIG. 34 is a horizontal cross-sectional plan view showing the tire vulcanizer taken along the line 34—34 in FIG. 32.

FIG. 1 is a front view showing a tire vulcanizer in accordance with a first embodiment of the present invention; FIG. 2 is a plan view showing the tire vulcanizer shown in FIG. 1; and FIG. 3 is a vertical cross-sectional side view showing one example of a slit mold unit used in the tire vulcanizer, the details of which are substantially identical to the tire vulcanizer split mold unit shown in FIG. 25. FIGS. 4 to 17 are diagrams explanatorily showing the operation of the tire vulcanizer.

Figure 23:
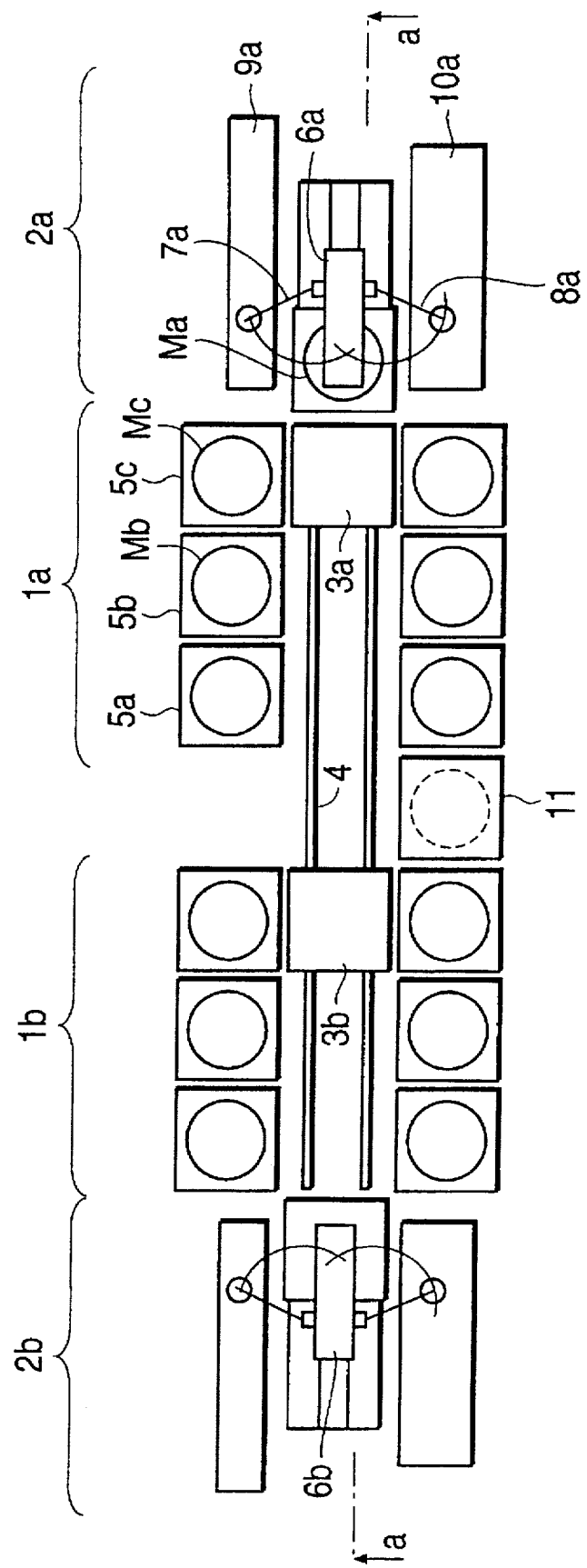
FIG. 23 is a plan view showing a prior art tire vulcanizer.
Figure 24:
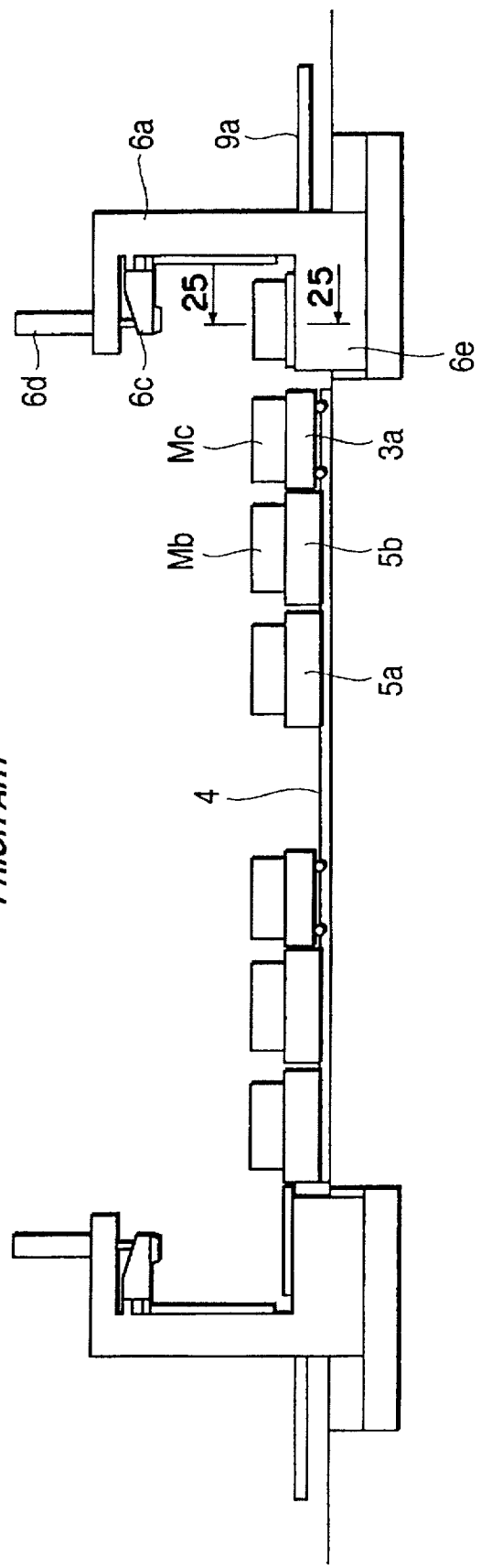
FIG. 24 is a vertical cross-sectional front view showing the tire vulcanizer taken along the lines a—a in FIG. 23.

The tire vulcanizer of the present invention shown in FIGS. 1 and 2 are also equipped with a mold exchange station of the tire vulcanizer shown in FIGS. 23 and 24 and an opposite tire vulcanizer commonly using that mold exchange station although they are not shown.

Hereinafter, a description will be given of the tire vulcanizer in accordance with the present invention with reference to FIGS. 1 and 2.

Reference numeral 301 denotes a base of a mold opening/closing station on which a hydraulic unit 302 is located at an appropriate position. On the upper surface of the base 301, straight rails 303, 304 and 305 are located in parallel in such a manner that they can be moved by bearing nuts 307 attached to the lower portion of a gate-type moving frame 306.

This movement is conducted by a hydraulic cylinder 308 having one end coupled to the base 301 and the other end coupled to an appropriate portion of the moving frame 306 so that the straight rails 303, 304 and 305 can reciprocate between the stop center a and stand-by position b of a mold M and carrier truck D. Known means (not shown) is provided which accurately stops the straight rails 303, 304 and 305 so that the center of the lower portion Mb of the mold M coincides with the center of the upper portion Ma of the mold M hung toward the side of the moving frame 306 at the position a.

The moving frame 306 is comprised of a main leg 306a which travels on the horizontal straight rails 303 and 304, a sub-leg 306c which travels on the horizontal straight railway 305, and a beam 306b which couples the upper ends of the main leg 306a and sub-leg 206c together (the main leg 306a, the beam 306b and the sub-leg 306c may be integrally structured).

A bolster plate 311 is allowed to go up and down by a hydraulic cylinders 310 which is disposed at an appropriate portion of the foregoing beam 306b with the guide of a vertical straight rail 309 provided in the main leg 306a.

The bolster plate 311 is provided with plural pairs of coupling units 312, as well as a split mold operating unit at the center thereof, which is disclosed in the above-mentioned Japanese Patent Application No. Hei 6-122661.

A column 313a of a tire handling unit 313 is fixed onto an appropriate portion of the base 301 and equipped with a known elevation guide unit and elevation drive unit. A gripping unit 313b is swingably disposed on the elevating portion.

The foregoing gripping unit 313b can stop and go up and down at a position a which is the center of the lower mold portion of the mold M, a tire take-out position c, and an unvulcanized tire receiving position d, respectively.

The foregoing gripping unit 313b has an upper limit at the position a and a lower limit at the position d. FIG. 1 shows a state in which the gripping unit 313b is at the position a.

The gripping unit 313b can be freely enlarged and reduced and is of a known structure by which the upper bead portions of the tire T and unvulcanized tire G are conveniently gripped from the interior thereof.

Reference numeral 314 denotes a base of the vulcanizing stations. Each of the vulcanizing stations is equipped with a known guide roller group 314a which conveniently conducts the take-in and take-out of the mold M, a load roller group 314b which receives a load, and an inner and outer pressure supply unit (not shown).

A straight railway 314c for the mold carrier truck D is disposed in the center of the base 314, thereby enabling the movement and stoppage of the truck.

Similarly, on the mold carrier truck D, there are provided what are similar to the foregoing guide roller and the load receiving roller. The orientation of arrangement of the roller is identical to that of each of the rollers 314a and 314b in each of the vulcanizing stations.

A push-out and draw-in unit (not shown) is disposed on the upper portion of the mold carrier truck D so that it transfers the mold M onto the mold carrier truck D or delivers from the truck D to each of the vulcanizing stations.

A plurality of columns 315 stands at the appropriate portions of the base 314 so that a floor 316 is located on the upper portions of those columns 315. A turn table 317 which turns a plurality of unvulcanized tires G (for example, which is similar to what is found at a baggage receiving area in an airport, etc.) is disposed on the floor 316.

An unvulcanized tire transfer unit 318 is disposed between a predetermined position e on the turn table 317 and the unvulcanized tire receiving position d of the foregoing tire handling unit so as to be reciprocatable therebetween.

A known unit similar to the tire handling unit 313 is used for the unvulcanized tire transfer unit 318, and the unvulcanized tire is mounted on an unvulcanized tire pedestal 320 fixed at an appropriate portion.

The unvulcanized tires G on the turn table 317 are rotatably moved as the occasion demands, and a selected unvulcanized tire G is stopped at the position e.

Provided on the floor 316 is a known roller conveyor 319 which takes out the tire T which has been taken out by the gripping unit 313b of the tire handling unit to the exterior of the tire vulcanizer.

The unvulcanized tire G is transported into an unused space for storing the unvulcanized tires above the turntable 317 from the molding process, etc,, through appropriate means, for example, a monorail type overhead traveling transfer for supplement.

Subsequently, a description will be given in more detail of the operation of the tire vulcanizer shown in FIGS. 1 and 2.

(1) Tire vulcanizing molds M where vulcanization has been finished is transported by the mold carrier truck to a given position in the mold opening/closing station from a vulcanizing station in which a plurality of tire vulcanizing molds M, where vulcanization is being conducted, are arranged. In this situation, the mold opening/closing units 306 to 312 go down to a position where they do not obstruct the progress of the mold and are then on stand-by. On the other hand, the gripping unit 313b of the tire handling unit 313 is on stand-by above the tire exhaust position under the state where both the vulcanized tire and unvulcanized tire are not gripped (refer to FIGS. 4 and 5).

Figure 6:
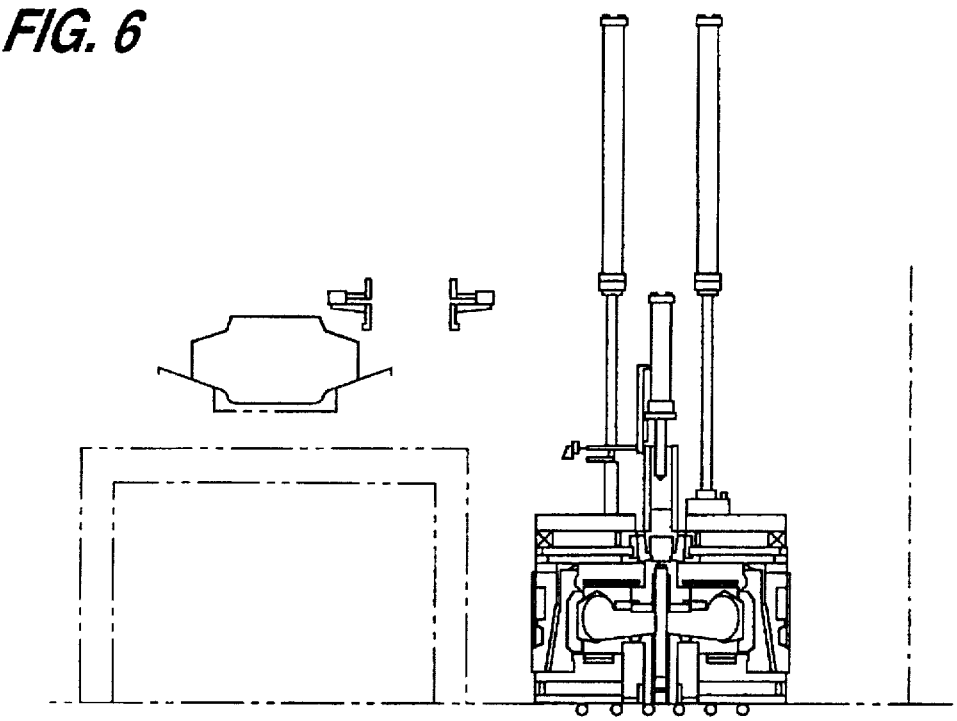
FIG. 6 is a diagram explanatorily showing the operation of the tire vulcanizer.
Figure 7:
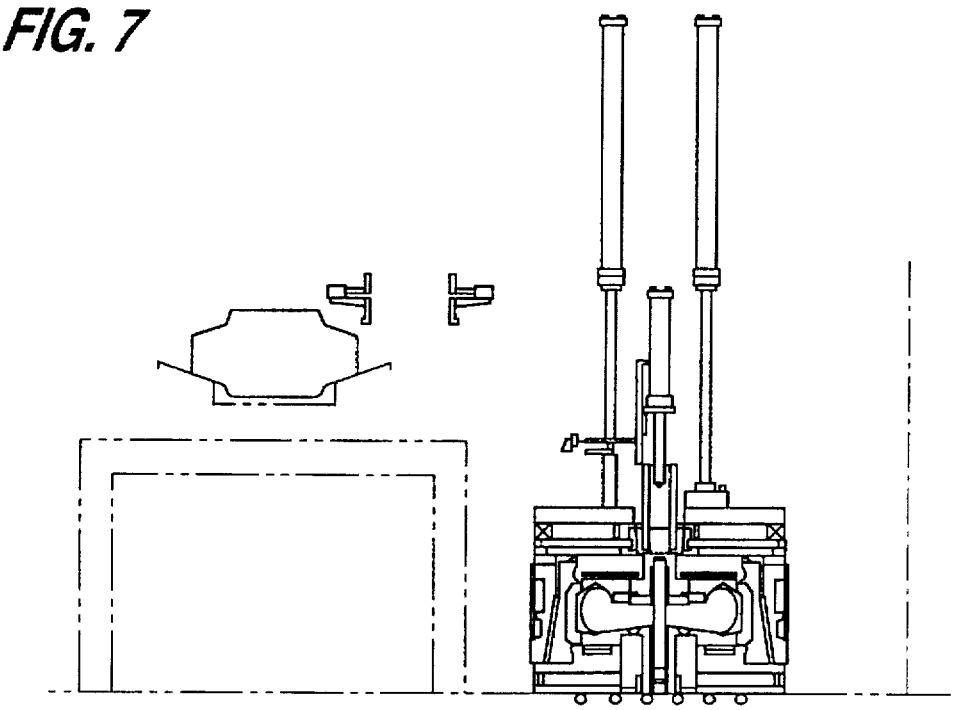
FIG. 7 is a diagram explanatorily showing the operation of the tire vulcanizer.
Figure 8:
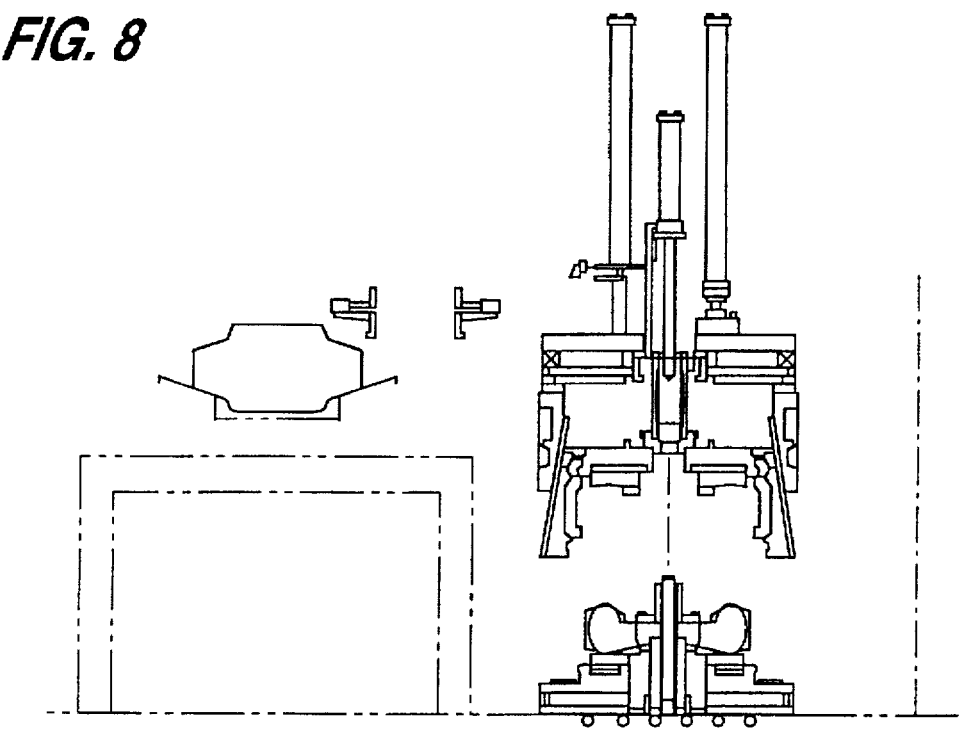
FIG. 8 is a diagram explanatorily showing the operation of the tire vulcanizer.
Figure 9:
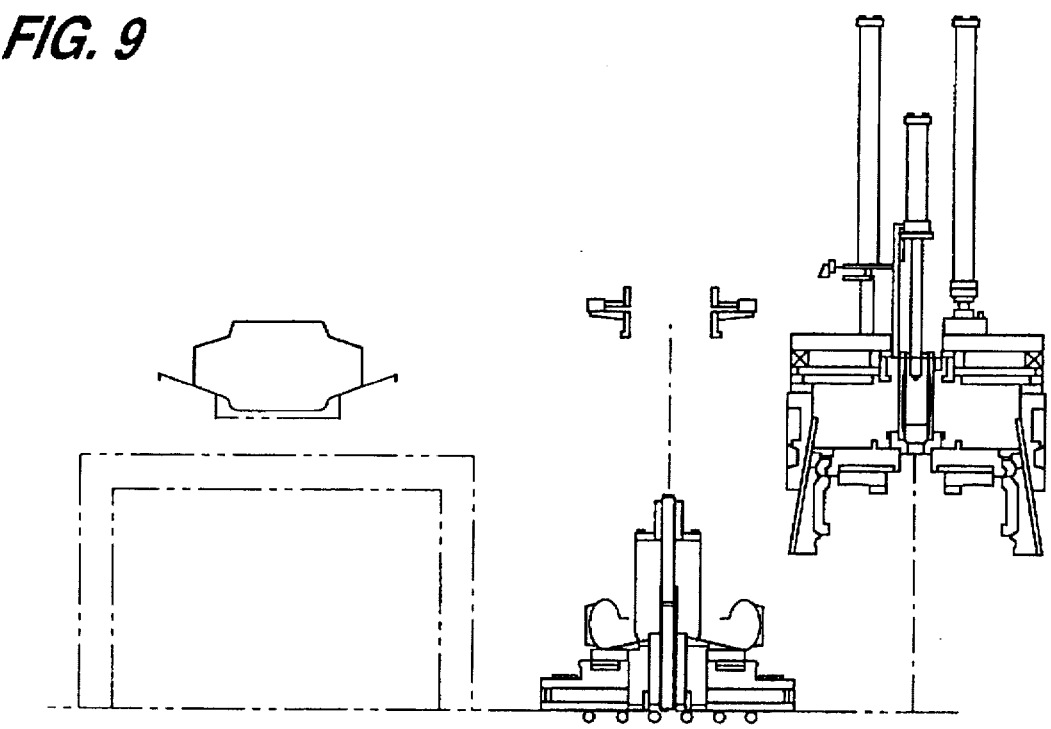
FIG. 9 is a diagram explanatorily showing the operation of the tire vulcanizer.
Figure 10:
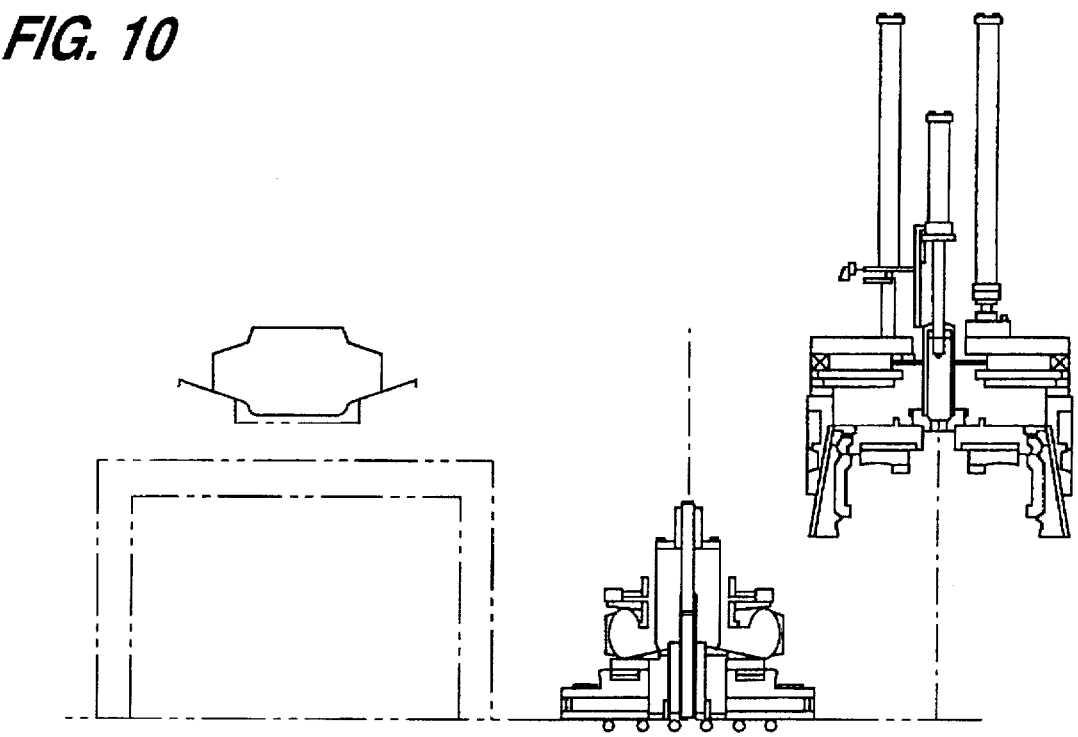
FIG. 10 is a diagram explanatorily showing the operation of the tire vulcanizer.
Figure 11:
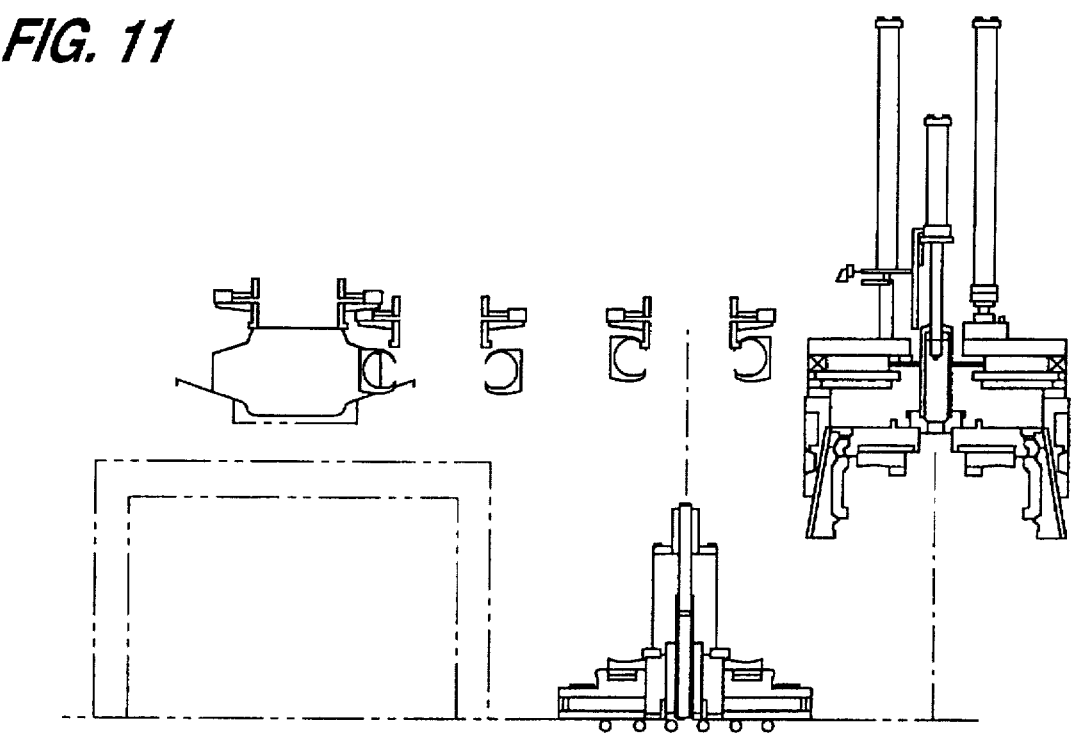
FIG. 11 is a diagram explanatorily showing the operation of the tire vulcanizer.

(2) After the mold has stopped at the given position, the mold opening/closing units 306 to 312 go down and are then coupled to the mold (refer to FIGS. 6 and 7).

(3) The mold opening/closing units 306 to 312 go up, and the tire vulcanizing mold (split mold) M is opened. The upper mold portion reaches a position which is slightly higher than the tire remaining on the lower mold and the bladder operating mechanism (see FIG. 8).

(4) The mold opening/closing units 306 to 312 are moved horizontally before stopping. After the units 306 to 312 have stopped, the bladder within the tire extends so as to be peeled off from the inner surface of the tire while the tire handling unit 313 starts the actuation for receiving the tire (refer to FIG. 9).

(5) The gripping unit 313b of the tire handing unit 313 goes down to grip the upper bead portion of the tire. Simultaneously, the mold opening/closing units 306 to 312 draw in all or a part of the split molds which are opened once at a stop position, and the lowermost limit position of the upper mold portion rises before the succeeding preparatory actuation of lateral movement is conducted (refer to FIG. 10).

(6) The gripping unit 313b of the tire handling unit 313 goes up while gripping the tire. When the gripping unit 313b goes up to a predetermined position, it is moved to the tire exhaust position to exhaust the tire (refer to FIG. 11). After exhausting the tire, the gripping unit 313b is moved to the unvulcanized tire receiving position to receive the unvulcanized tire.

Figure 12:
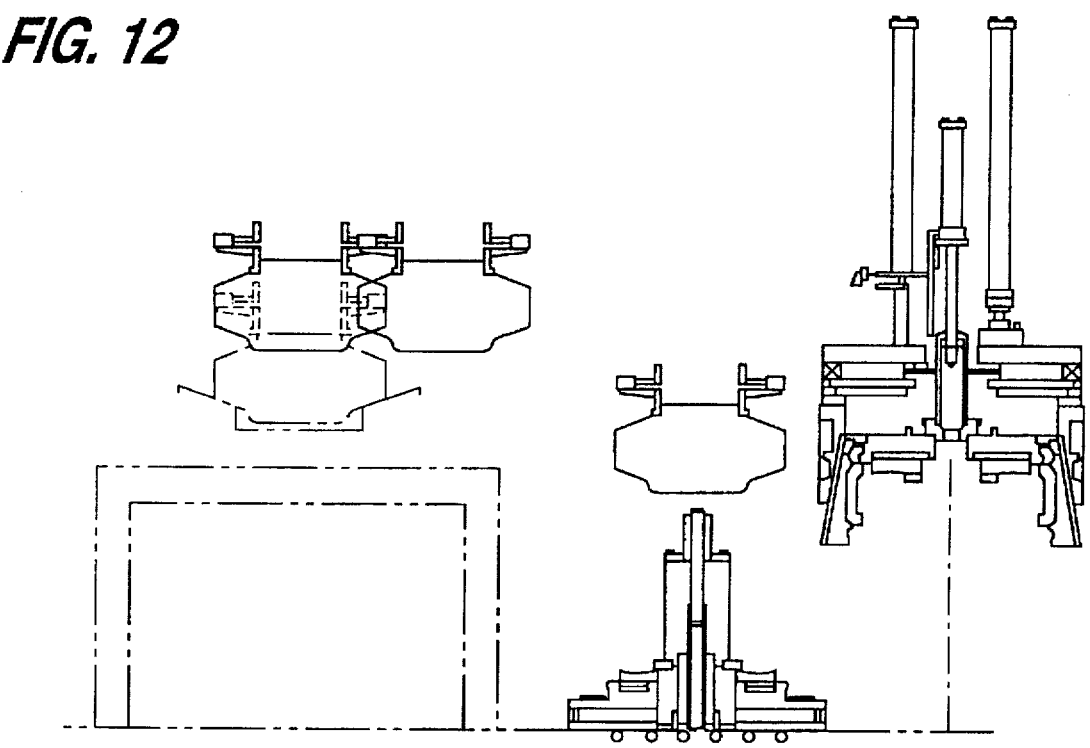
FIG. 12 is a diagram explanatorily showing the operation of the tire vulcanizer.
Figure 13:
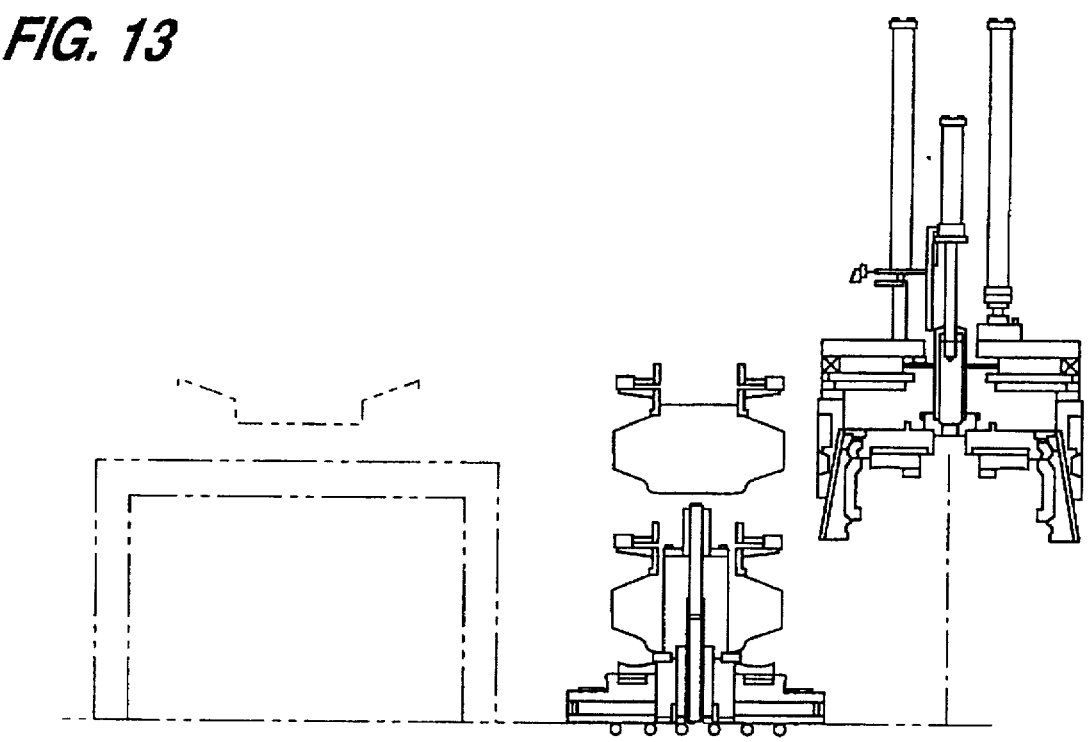
FIG. 13 is a diagram explanatorily showing the operation of the tire vulcanizer.
Figure 14:
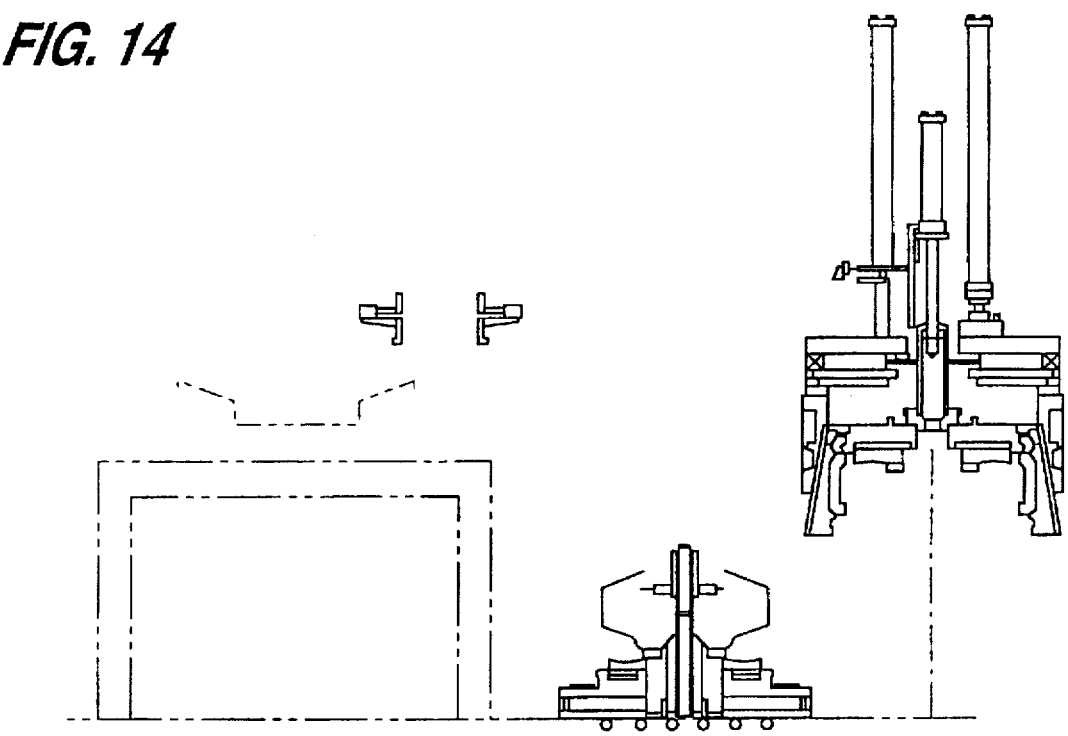
FIG. 14 is a diagram explanatorily showing the operation of the tire vulcanizer.
Figure 15:
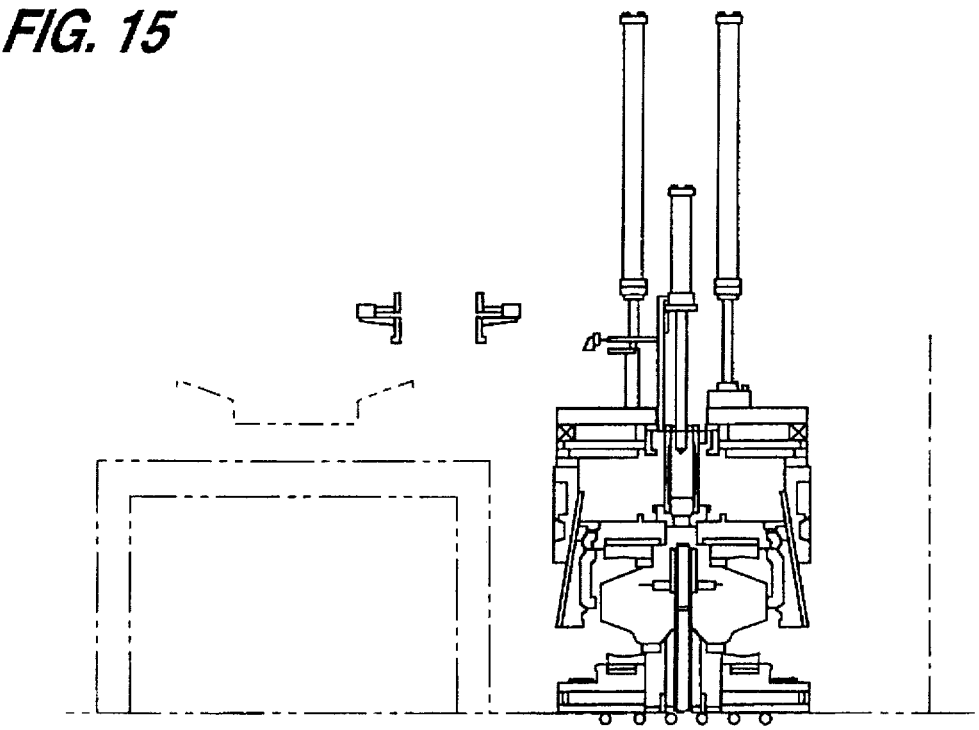
FIG. 15 is a diagram explanatorily showing the operation of the tire vulcanizer.

(7) After receiving the unvulcanized tire, the gripping unit 313b is moved to the lower mold upper position, and subsequently goes down so that the lower bead portion of the unvulcanized tire is engaged with the bead ring mold of the lower mold (refer to FIGS. 12 and 13).

(8) Sequentially, a pressure medium is supplied to the interior of the bladder, and the bladder is inserted into the unvulcanized tire. At an appropriate timing, after the gripping unit 313b of the tire handling unit 313 releases the unvulcanized tire and lifts up, it returns to the tire exhaust position to be on stand-by (refer to FIG. 14).

(9) The mold opening/closing units 306 to 312 which have been on stand-by are moved horizontally and stops so that the upper mold coincides with the center of the lower mold. Thereafter, the mold opening/closing units 306 to 312 go down and start the mold closing actuation (refer to FIG. 15).

Figure 16:
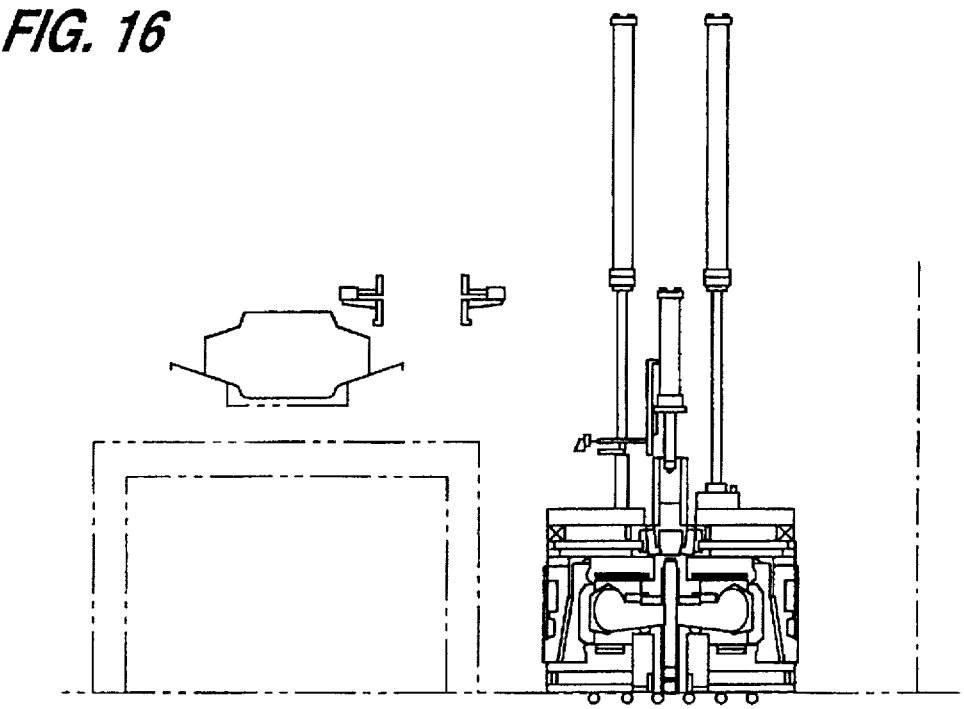
FIG. 16 is a diagram explanatorily showing the operation of the tire vulcanizer.
Figure 17:
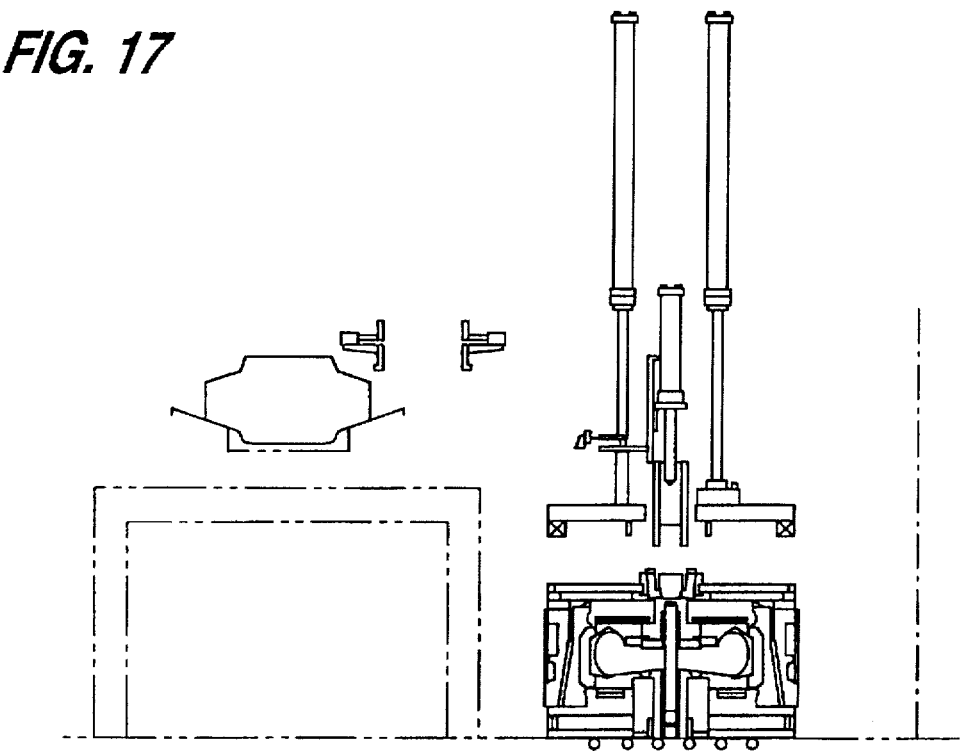
FIG. 17 is a diagram explanatorily showing the operation of the tire vulcanizer.

(10) After the mold closing actuation has been completed, the coupling of the mold opening/closing units 306 to 312 to the molds is released, and the mold opening/closing units 306 to 312 are moved to a lower position where they do not obstruct the movement of the mold, and then area on stand-by until a succeeding mold is inserted therein (refer to FIGS. 16 and 17).

(11) The transporting unit returns the mold to the original position of the vulcanizing station. Following the above, the same operation is repeated.

(12) The exhausted tire is forwarded toward a main conveyor through a roller conveyor prepared at an appropriate portion above the vulcanizing station, etc. Then, an unvulcanized tire to be succeedingly supplied is selected from the preparatory tires, and supplied to the unvulcanized tire supply unit.

Subsequently, another embodiment of the present invention will be described with reference to FIGS. 18 to 22.

Figure 18:
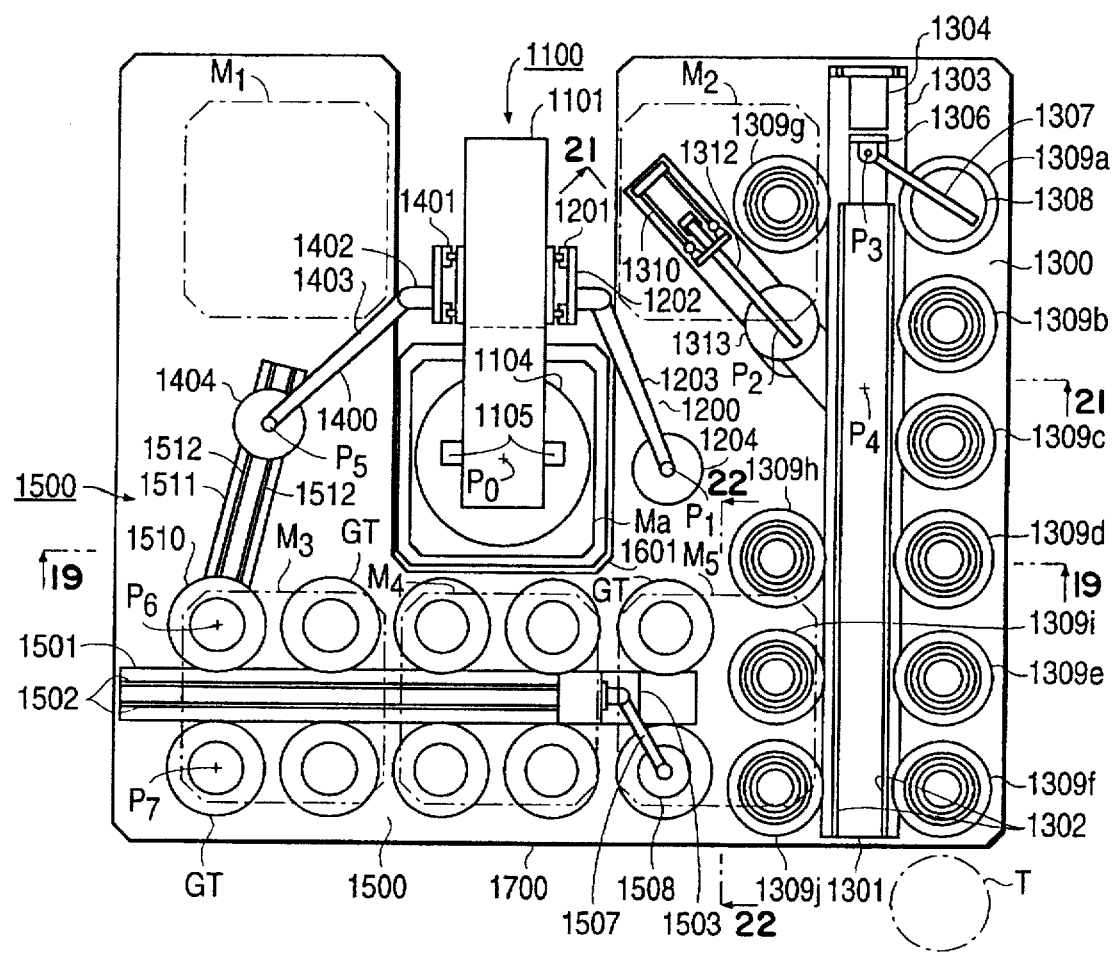
FIG. 18 is a plan view showing a tire vulcanizer in accordance with another embodiment of the present invention.

The tire vulcanizer of this embodiment, as shown in FIG. 18, includes a mold opening/closing unit 1100, an unloader 1200 for the vulcanized tire, a cooler 1300 for the vulcanized tire, a loader 1400 for the unvulcanized tire, an unvulcanized tire supplier 1500, plural pairs of tire mold assemblies M ($M_1$ to $M_5$), a tire mold carrier truck 1600, and a floor 1700 which is supported by columns (not shown) for locating the cooler 1300 and the supplier 1500 in a space above the foregoing plural pairs of tire mold assembly.

The mold opening/closing station is equipped with the foregoing mold opening/closing unit 1100, the foregoing unloader 1200 for the vulcanized tire, and the foregoing loader 1400 of the unvulcanized tire.

The vulcanized station is equipped with the foregoing mold assemblies M and a mold table 1800.

The foregoing mold opening/closing unit 1100 is comprised of a lateral beam portion 1101a, a set-up column portion 1101b, a frame 1101 located on a mold table 1800a of the vulcanizing station, a guide bracket 1103 which slides on a straight rails 1102 fixed onto the foregoing set-up column 1101b, a disc 1104 fixed onto the guide bracket 1103, an elevating. cylinder 1105 having one end attached to the lateral beam 1101a and a rod 1105a coupled to the disc 1104, a known split mold operating unit 1107 (refer to Japanese Patent Application No. Hei 6-122661) including the split mold operating cylinder 1106 set up in the center of the foregoing disc 1104, and known plural pairs of mold coupling units 1108 (refer to Japanese Patent Application No. Sho 63-283800) in the outer periphery of the foregoing disc 1104.

Figure 19:
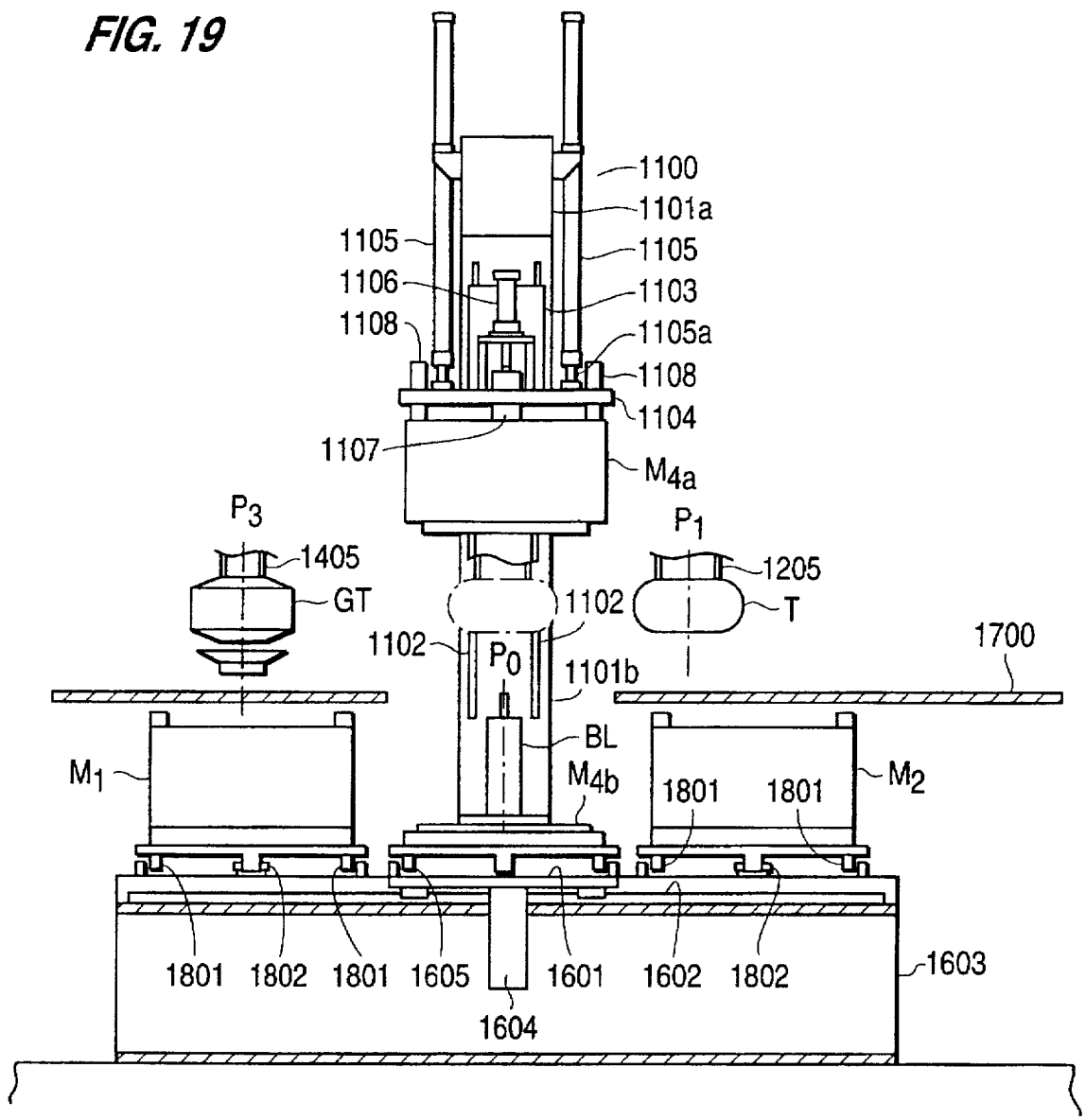
FIG. 19 is a vertical cross-sectional side view showing the tire vulcanizer taken along the line 19—19 in FIG. 18.

Accordingly, when the tire mold carrier truck 1601 of the tire mold carrier truck 1600 brings any one of the tire molds $M_1$ to $M_5$ and stops so as to coincide with the mold center position of the mold opening/closing unit 1100, the cylinder 1105 allows the disc 1104 to go down, and the mold coupling unit 1108 couples with the tire mold and goes up so as to open the tire mold as shown in FIG. 19. FIG. 19 shows a state in which the upper mold portion $M_{4a}$ of the tire mold assembly $M_4$ lifts up, and the lower mold portion $M_{4b}$ remains on the truck 1601.

The tire mold carrier assembly 1600 includes a tire mold carrier truck 1601, a base 1603 which fixes a straight rail 1602 moving the tire mold carrier truck 1601 and has a driver unit (not shown, for example, a motor, a rack gear and pinion gear, etc.), and a known bladder operating mechanism 1604 which extends or reduces a bladder BL disposed in the interior of each of the tire mold assemblies $M_1$ to $M_5$. The foregoing bladder operating mechanism 1604 hangs from the central lower portion of the foregoing tire mold carrier truck 1601.

A driver source, a signal wiring, etc., for the foregoing bladder operating mechanism 1604 which moves together with the tire mold carrier truck 1601, etc., are disposed between the foregoing base 1603 and the foregoing truck 1601, although they are not shown.

The tire mold carrier truck 1601 includes a known stopper unit (not shown) for accurately stopping at a position where each mold is received. Also, a guide roller group 1605, which moves the tire mold assemblies $M_1$ to $M_5$ between the vulcanizing station and the tire mold carrier truck 1601, is disposed on the upper surface of the tire mold carrier truck 1601.

The carrier station is comprised of a mold table 1800a (a first vulcanizing station C1) on which the mold assemblies $M_1$ and $M_2$ are mounted and the set-up column portion 1101b of the foregoing mold opening/closing unit 1100 is set up, the mold assemblies $M_3$, $M_4$ and $M_5$, and a mold table 1800b on which the mold assemblies $M_3$, $M_4$ and $M_5$ are mounted.

Figure 20:
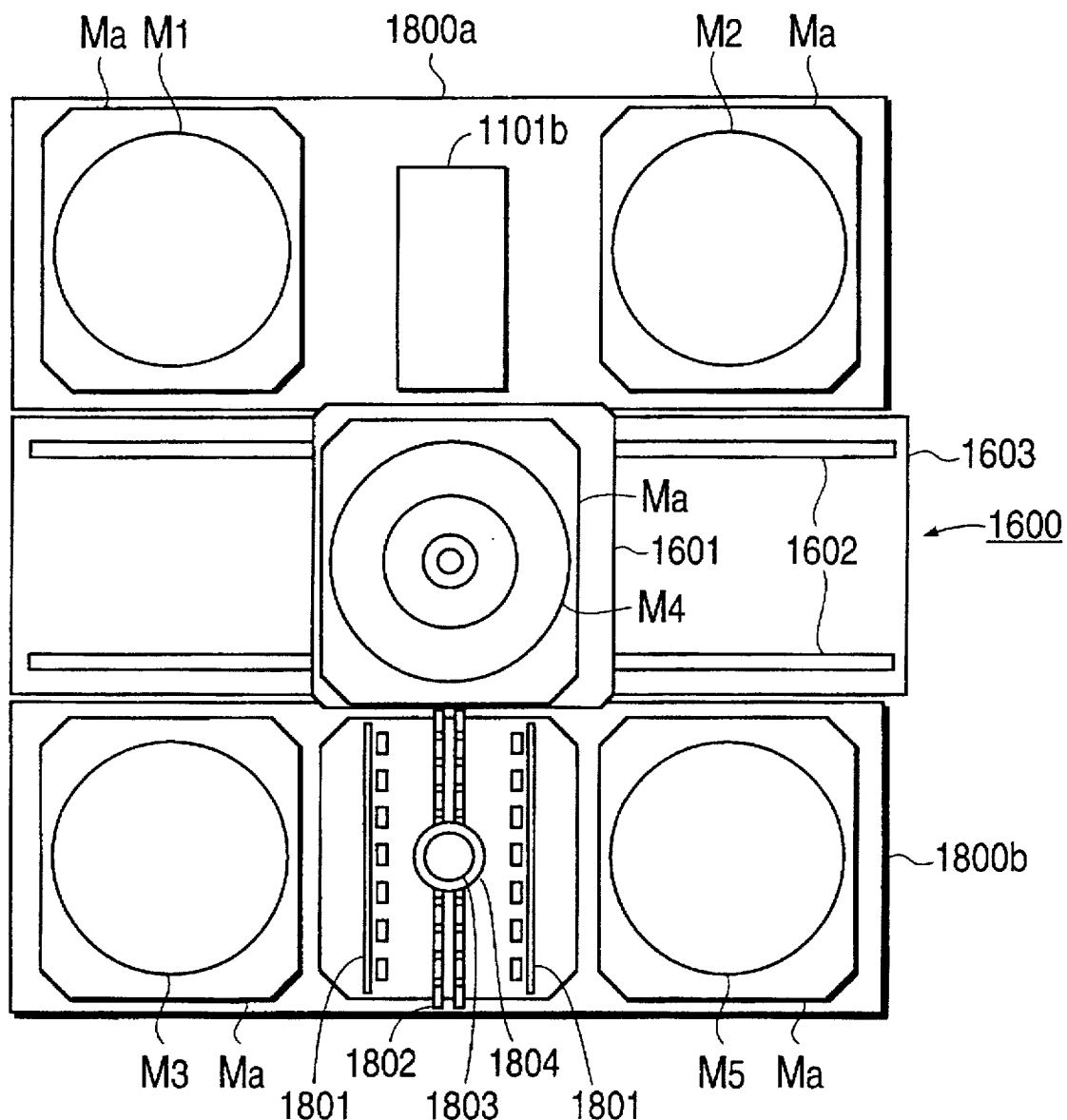
FIG. 20 is a plan view showing a tire mold carrier truck of the tire vulcanizer of FIG. 18.

Each mold assembly portion of the mold tables 1800a and 1800b, as shown by the position of the tire mold assembly $M_4$ in FIG. 20, includes a load receiving roller assembly 1801 for the movement to the side of the tire mold carrier truck 1601, a guide railway roller assembly 1802, a heated and pressurized medium supply unit 1803 for supplying the medium to the interior of the tire, and a through-hole 1804 for allowing the heated and pressurized medium supply unit 1803 to go up and down. The mold assembly portion is also equipped with a stop positioning unit (not shown), etc.

The tire mold assembly M ($M_1$ to $M_5$) is constituted by, for example, a mold of the type which does not require fastening a tire vulcanizing mold from the exterior of the tire vulcanizing mold so that the mold is prevented from opening during vulcanizing operation, by offsetting a force which is exerted to open the mold by the aid of a pressure of a heated and pressurized medium having a high temperature and a high pressure which is introduced into the inside of the tire (a mold disclosed in Japanese Patent Application No. Hei 6-122661), and a guide rail (not shown) which matches the roller groups 1801 and 1802 on the foregoing mold table is disposed on the lower portion of the base plate Ma.

The unloader 1200 of the vulcanized tire is comprised of a straight rail 1201 fixed onto the set-up column portion 1101b of the foregoing mold opening/closing unit 1100, a movable truck 1202 which slides on the straight rail 1201, an arm 1203 disposed so as to be swingable on the movable truck 1202, and a known gripping unit 1204 disposed on the tip portion of the arm 1203. A cylinder (not shown) makes the movable truck 1202 go up and down, a cylinder (not shown) makes the arm 1203 swing, and a cylinder (not shown) makes the gripping claw 1205 of the gripping unit 1204 freely open and close.

The center of the gripping unit 1204 of the foregoing unloader 1200 is reciprocatingly swingable between a position $P_0$ where it coincides with the center of the lower mold portion (for example, the lower mold portion $M_4$) on the foregoing tire mold carrier truck 1601, a center position $P_2$ of a cooling ring opening/closing unit which will be described later, and an intermediate position $P_1$ between the respective positions $P_0$ and $P_1$.

The gripping unit 1204 of the unloader 1200 which has been on stand-by at the intermediate position $P_1$ enters the lower portion of the upper mold portion Ma which has been opened by the mold opening/closing unit 1100, and goes down. The gripping unit 1204 grips the tire T on the lower mold portion $M_{4b}$ by expanding the gripping claw 1205, and then lifts up at an appropriate timing. After the gripping unit 1204 has lifted to a position indicated by a dashed line in FIG. 19, it takes out the tire T to the position $P_1$. After taking out the tire T, the gripping unit 1204 lifts up at the position $P_1$ where it conveniently enters the cooling ring opening/closing unit which will be described, and thereafter enters the position $P_2$. Subsequently, the gripping unit 1204 goes down to locate the tire T on the cooling ring by reducing the diameter of the gripping claw 1205. Again, the gripping unit 1204 returns to the position $P_1$ and is on stand-by at the position $P_1$ until the subsequent operating time.

The loader 1400 of the unvulcanized tire GT is comprised of a straight rail 1401 fixed onto the set-up column portion 1101b of the foregoing mold opening/closing unit 1100, a movable truck 1402 which slides on the straight rail 1401, an arm 1403 disposed swingably on the movable truck 1402, and a known gripping unit 1404 disposed on the tip portion of the arm 1403. A cylinder (not shown) makes the movable truck 1402 go up and down, a cylinder (not shown) makes the arm 1403 swing, and a cylinder (not shown) makes the gripping claw 1405 of the gripping unit 1404 freely open and close.

The center of the gripping unit 1404 of the foregoing loader is reciprocatingly swingable between a position $P_0$ where it coincides with the center of the lower mold portion $M_{4b}$ on the foregoing tire mold carrier truck 1601 and a stop position $P_5$ of the movable tire support table for the unvulcanized tire supplier which will be described later.

The gripping unit 1404 of the loader 1400 which has been on stand-by while gripping the unvulcanized tire GT which has been prepared at the position $P_5$ enters the position $P_0$ simultaneously when the gripping unit 1204 of the foregoing unloader 1200 starts to leave from the point $P_0$, and goes down at the position $P_0$ to locate the unvulcanized tire GT on the lower mold portion $M_{4b}$.

In this situation, the bladder BL is inserted into the unvulcanized tire GT in a known procedure while being reduced in length by the bladder operating mechanism 1604. Thereafter, the gripping claw 1405 releases the unvulcanized tire GT and goes up so as to return to the foregoing position $P_5$. Then, as occasion demands, the gripping claw 1405 goes up and is on stand-by until a subsequent unvulcanized tire GT is prepared to the lower portion of the gripping portion 1404.

The cooler 1300 of the vulcanized tire is comprised of the foregoing floor 1700, a base 1301 located thereon, a truck 1303 which slides on a straight rail 1302 located thereon by a driver unit (not shown), a column 1304 set up on the truck 1303, a vertical straight rail 1305 fixed onto the column 1304, a cylinder 1314 installed in the column 1304, a truck 1306 which slides on the foregoing vertical straight rail 1305 by the cylinder 1314, an arm 1307 disposed swingably on the truck 1306, a gripping unit 1308 disposed on the tip portion of the arm 1307, a plurality of arms 1301a disposed so as to be perpendicular to the foregoing straight rail 1302 and projected from the base 1301 outward, an assembly 1309 (cooling unit) (1309a to 1309j) consisting of the cooling ring and plural pairs of tires T mounted on each of the arms 1301a, an arm 1301b disposed so as to be projected from the foregoing base 1301 outward, a column 1310 set up on the arm 1301b, a vertical straight rail 1311 fixed onto the column 1310, a cylinder 1315 installed in the foregoing column 1310, a truck 1312a which slides on the foregoing vertical straight rail 1311 by the cylinder 1315, an arm 1312 disposed on the truck 1312a, and a gripping unit 1313 attached to the arm 1312.

The opening/closing units 1310 to 1315 is comprised of the foregoing column 1310, the vertical straight rail 1311, the cylinder 1315, the truck 1312a, the arm 1312 and the gripping unit 1313.

Of the foregoing assemblies 1309, the center of an assembly 1309b (refer to FIG. 1) is selected to an symmetrical position to the foregoing center position $P_2$. Then, other assemblies 1309a, 1309c, 1309d, 1309e and 1309f are disposed at regular intervals on a reference line which is parallel to the center line of the foregoing base 1301 through the center of the foregoing assembly 1309b.

Also, other assemblies 1309g, 1309h, 1309i and 1309j are disposed at regular intervals on a reference line which is parallel to the center line of the foregoing base 1301 through the foregoing center position $P_2$.

Figure 21:
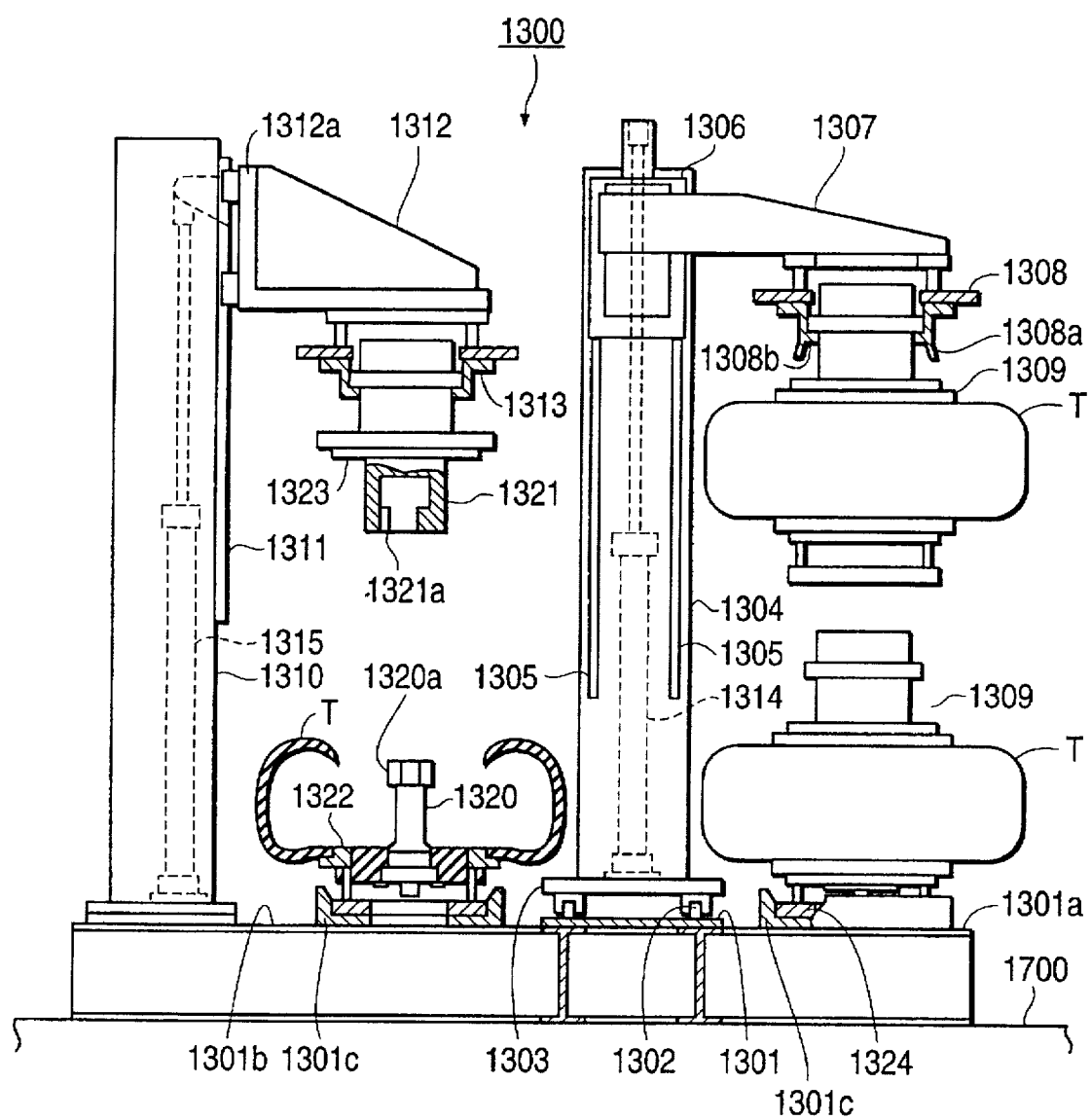
FIG. 21 is a vertical cross-sectional side view showing the tire vulcanizer taken along the line 21—21 in FIG. 18.
Figure 22:
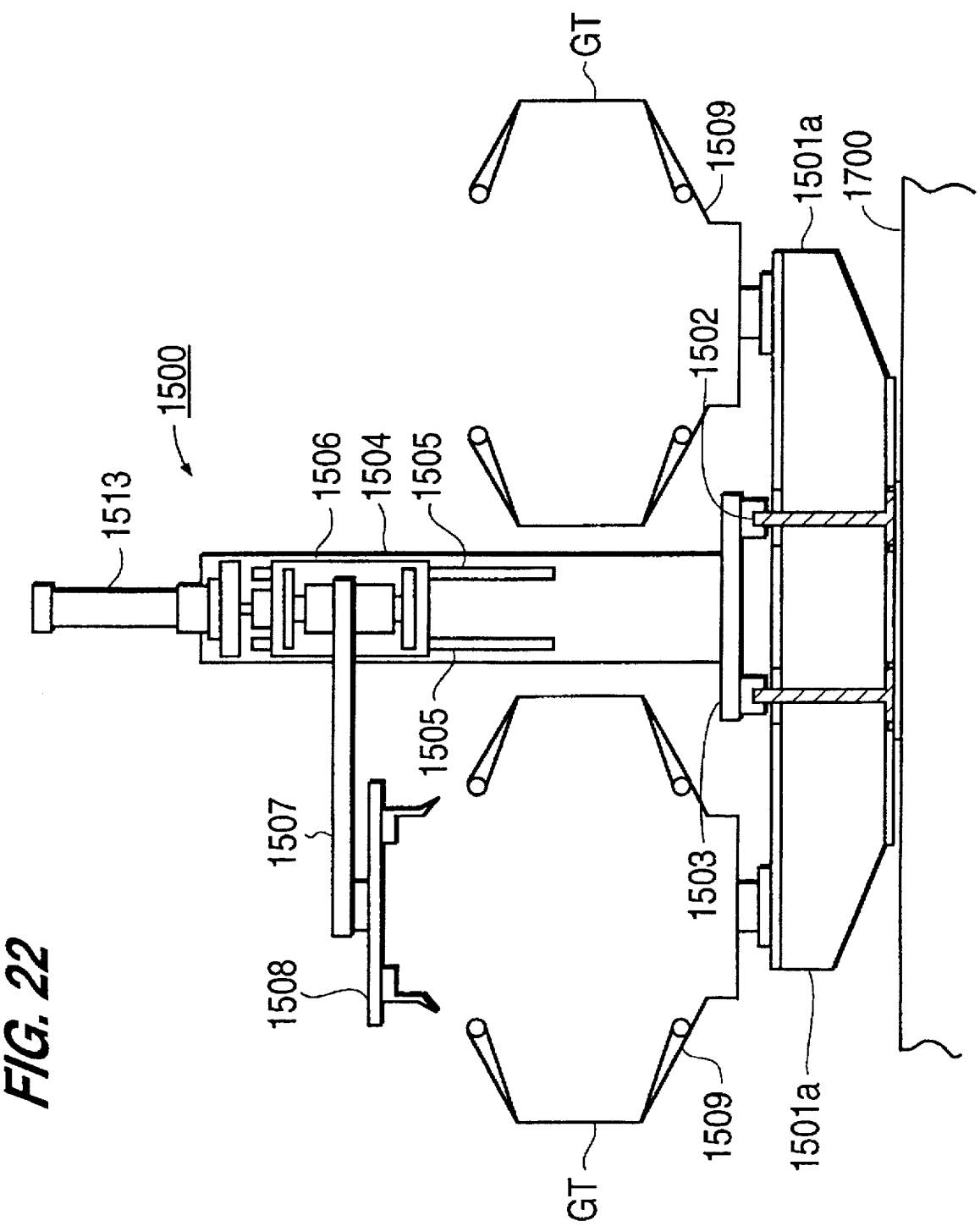
FIG. 22 is a vertical cross-sectional side view showing the tire vulcanizer taken along the line 22—22 in FIG. 18.

Since the swing center P3 of the foregoing arm 1307 is moved on the center line of the foregoing base 1301, when the center of the gripping unit 1308 stops at a position where it coincides with the center of the assembly 1309, the gripping unit 1308 coincides with the center of the assembly 1309g at the opposite side with the arm 1307 swinging toward the opposite side. In other words, with the control of the stop position of the truck 1303 at 6 positions, 10 pairs of assemblies 1309a to 1309j can be selectively gripped, and the take-in and take-out of the assembly with respect to the center $P_2$ of the opening/closing unit can also be conducted. For example, when the assembly 1309a is transported to the position $P_2$, the assembly 1309a is gripped at the position $P_3$ through the gripping unit 1308 and goes up before moving to the position $P_4$. The above moving state is shown in FIG. 21.

After stopping at the position $P_4$, the gripping unit 1308 allows the arm 1307 to swing so that the assembly 1309a is transferred to the opposite line side and allowed to go down so that the gripping unit 1308 allows the assembly 1309a to move at the position $P_2$.

After the movement has stopped, the gripping unit 1308 is allowed to go down again so that the assembly 1309a is located at the position $P_2$. After finishing at this location, the gripping unit 1308 is allowed to go up to a position where it does not obstruct movement by releasing the inner claw 1308a of the gripping unit 1308. Then, the gripping unit 1308 makes the swinging center of the arm 1307 move to the position $P_4$, and is thus on standby.

The pressure air within the tire T of the assembly 1309a taken in and located from the foregoing gripping unit 1308 is exhausted from a changeover valve (not shown), and a lock shaft 1320 is rotated by a cylinder (not shown). A lock claw 1321a of a lock housing 1321 and a lock claw 1320a of the lock shaft 1320 come to a state where they can be drawn out and inserted so that the tire T remains on the lower rim 1322, and the upper rim 1323 lifts up together with the lock housing 1321.

Thereafter, an outer claw 1308b of the gripping unit 1308, which has been on stand-by, grips the upper bead portion of the cooled tire T and moves it to the tire exhaust position at the side of the assembly 1309f. After the exhaust has been accomplished, the outer claw 1308b returns to the position $P_4$.

At an appropriate timing, where the tire T is exhausted by the rim 1322, a high-temperature vulcanized tire which is gripped by the gripping unit 1204 of the unloader 1200 enters the opening/closing unit and is located on the lower rim 1322 immediately after the tire T is discharged. Then, the gripping unit 1204 leaves and moves to the position $P_1$. After leaving, the upper rim 1323 and the lock housing 1321 are allowed to go down. After the lock claw 1320a has passed a lock claw 1321a, the lock shaft 1320 is rotated so as to be in a coupling state. Then, air of a predetermined pressure is supplied to the interior of the tire, and the foregoing changeover valve is actuated to enclose the foregoing pressure air with the tire. The gripping unit 1313 is released and goes up. Subsequently, the gripping unit 1308 which is now on stand-by enters, grips the rim assembly 1309a and goes up to transport it to the original place in the reverse procedure.

It should be noted that the lower plate 1324 of the foregoing rim assembly 1309 is centered by the arm 1301a and the positioning ring 1301c on the arm 1301b.

The supplier 1500 of the unvulcanized tire is comprised of a truck 1503 which slides on a straight rail 1502 on the base 1501 located on the foregoing floor 1700 by a driver unit (not shown), a column 1504 set up on the truck 1503, vertical straight rails 1505 fixed onto the foregoing column 1504, a truck 1506 which slides on the foregoing vertical straight rails 1505 by the cylinder 1513, an arm 1507 disposed swingably on the truck 1506, a gripping unit 1508 attached to the tip portion of the arm 1507, a plurality of arms 1501a disposed so as to be perpendicular to the foregoing straight rail 1502 and to be projected from both sides of the foregoing base 1501 outwardly, a plurality of support tables 1509 located on the respective arm 1501a for the unvulcanized tire GT, an unvulcanized tire sweep table 1510 which is reciprocatable between the stand-by position $P_5$ and leaving position $P_6$ of the gripping unit 1404 of the foregoing loader 1400 for the unvulcanized tire, a rail base 1511 for the movement of the support table (refer to FIG. 18), and a straight rail 1512 located on the rail base 1511.

The supply position $P_7$ for the unvulcanized tire is at a position symmetrical with the foregoing sweep position $P_6$, and the unvulcanized tire support table 1509 is arranged at a regular interval on the center line which is parallel to the center line of the foregoing base 1501 through the positions $P_6$ and $P_7$.

Since the center of the gripping unit 1508 of the foregoing truck 1503 can move and stop so as to coincide with the center of the respective unvulcanized tire support tables 1509 and unvulcanized tire sweep tables 1510, the unvulcanized tire GT supplied to the foregoing supply position $P_7$ can be transferred to the unvulcanized tire support table 1509 which is empty, or can sweep the unvulcanized tire GT stored on the unvulcanized tire support table 1509 to transfer it to the unvulcanized tire sweep table 1510.

Also, the unvulcanized tire sweep table 1510 which receives the unvulcanized tire GT at the position $P_6$ travels on the straight rail 1512 so as to be movable to the delivery position $P_5$ to the loader 1400.

Subsequently, a description will be given in more detail of the operation of the tire vulcanizer shown in FIGS. 18 to 22.

(1) The tire mold M (hereinafter, described using an example $M_4$) by which vulcanization has been finished in the vulcanizing station (M, 1800) is transported to the mold opening/closing station (1100, 1200, 1400) through the tire mold carrier truck 1600.

(2) The upper mold portion $M_{4a}$ of the transported tire mold M is coupled to the mold coupling unit of the mold opening/closing unit 1100, and then lifted up to open the tire mold M.

(3) During the foregoing operation, the lower mold portion $M_{4b}$ allows the vulcanized tire to be peeled off from the lower mold portion $M_{4b}$, and the vulcanized tire to be peeled off from the bladder. Subsequently, after the unloader 1200 inserted between the upper and lower mold portions, it is allowed to go down so as to grip the vulcanized tire placed on the lower mold $M_{4b}$. Then, the unloader 1200 is allowed to go up to take out the tire.

(4) After a loader 1400 which has been on standby while gripping the unvulcanized tire is allowed to enter the mold until the lift-up of the upper mold portion $M_{4a}$ is completed, the loader 1400 is allowed to go down in such a manner that the unvulcanized tire is placed on the lower mold portion $M_1$, and releases the unvulcanized tire. Then, the loader 1400 is returned to the original position.

(5) After the loader 1400 has been moved to a position where the loader does not interfere with other components, the upper mold portion $M_{4a}$ is allowed to go down. Then, the tire mold M is shaped and closed. After the tire mold M has been closed, the heated and pressurized medium is supplied to the interior of the tire.

(6) The coupling of the upper mold portion $M_{4a}$ of the tire mold $M_4$ to the mold opening/closing unit 1100 is released, and the mold opening/closing unit 1100 is lifted up to a position where it does not obstruct the movement of the tire mold M.

(7) The tire mold carrier truck 1600 makes the foregoing tire mold M return to the original position. Then, the supply of the foregoing heated and pressurized medium is temporarily interrupted immediately before the tire mold M is moved from the tire mold carrier truck 1600 to the vulcanizing station (M, 1800) side so that the heated and pressurized medium is charged into the tire. After the tire mold has been moved to the vulcanizing station (M, 1800) side, the supply of the heated and pressurized medium is restarted.

(8) The tire mold carrier truck 1600 which has delivered the tire mold M to the vulcanizing station (M, 1800) is moved to a tire mold position to be succeedingly transported, and the foregoing work is repeatedly performed.

(9) The vulcanized tire which has been taken out in the foregoing process (3) is supplied to the opening/closing units 1310 to 1315 of the tire cooler 1300. Before the tire is supplied to the opening/closing unit (1310 to 1315), an assembly (cooling unit) 1309 corresponding to the tire mold $M_4$ is gripped by the gripping unit of the truck so as to be located at the opening/closing unit (1310 to 1315), for example, upon the reception of a vulcanization end signal in the vulcanizing station. The opening/closing unit (1310 to 1315) allow the engagement of the upper and lower rims 1323 and 1322 of the assembly 1309 to be released, and the upper rim 1323 side to be lifted up so that the tire and the lower rib portion 1322 remain down. Thereafter, the foregoing gripping unit is inserted between the upper rim 1323 and the tire located on the lower rim 1322 so as to grip and remove out the tire. After the tire has been removed, the truck 1304 is returned to the opening/closing unit (1310 to 1315) again and is placed on standby. The opening/closing unit (1310 to 1315) waits for the removal of the vulcanized tire from the tire mold $M_4$ with the upper rim portion 1323 of the assembling unit 1309 being at the upper position and the lower rim portion 1322 thereof being at the lower position. This vulcanized tire is allowed to be inserted between the upper and lower rims 1323 and 1322 while it is gripped by the unloader 1200, and is then delivered before leaving. At an appropriate timing after the unloader has left, the upper rim portion 1323 is allowed to go down, and the upper and lower rims 1323 and 1322 are engaged with each other so that a predetermined air pressure is charged into the tire. After the air pressure has been charged, the coupling of the assembly 1309 to the opening/closing unit (1310 to 1315) is released, and the foregoing gripping unit 1308 of the truck 1304 which has been on standby grips the assembly 1309, transports the unit to the original position of the assembly 1309, and places it thereon softly. Thereafter, the gripping unit starts like works upon the reception of a signal representative of a vulcanization end from the opening/closing stations (1100, 1200, 1400) side.

(10) An operation before and when gripping the unvulcanized tire by the loader 1400 in the foregoing process (4) will be described. Upon the reception of the vulcanization end signal from the vulcanizing station (M, 1800), the unvulcanized tire corresponding to the foregoing tire mold $M_4$ is gripped by the take-out unit so as to be placed on the tire sweep table 1510. The unvulcanized tire sweep table 1510 to which the unvulcanized tire is delivered is moved to a position below the loader 1400 of the mold opening/closing unit 1100 before being stopped. The loader 1400 is allowed to go down to grip the unvulcanized tire. Then, the tire sweep table 510 stands by until the completion of a predetermined operation in the mold opening/closing unit 1100 and enters at an appropriate timing so that the unvulcanized tire is placed on the lower mold portion $M_2$. The foregoing take-out unit, after the delivery of the tire to the sweep table 1510, performs a work for moving to receive the unvulcanized tire to be succeedingly vulcanized, or a work for pulling out the tire supplied onto the tire receiving table to transfer it to an empty support table.

As mentioned above, the transportation of the mold where vulcanization has been finished, the opening/closing of the mold, the take-out of the vulcanized tire, the handling of the cooling unit, the take-in of the unvulcanized tire, and the preparation and supply of the unvulcanized tire are conductible appropriately.

The tire vulcanizer of the present invention is constituted as described above with the result that the following effects can be performed.

(1) The upper space of the vulcanizing station can be used for the storage and supply of the unvulcanized tire, resulting in no necessity of providing an unvulcanized tire supply table and a parking of the unvulcanized tire carrier truck, etc., in front of the tire vulcanizer, which have been required by the conventional tire vulcanizer. As a result, the occupied plane space can be saved.

(2) The open/close stroke of the mold opening/closing unit is reduced, and the mold opening/closing unit is lowered in the overall height in combination with the lateral movement, to thereby eliminate an interference with a plant house which is a problem caused in the conventional tire vulcanizer.

(3) The take-out conveyor of a complete tire can be located on the upper portion of the vulcanizing station, from the standpoint of which a space can be saved.

(4) The take-out of the complete tire and the supply of an unvulcanized tire are conducted by a single handling unit, which is advantageous economically.

(5) The vulcanized tire cooler and the unvulcanized tire supplier are disposed in a space above the foregoing vulcanizing station, and a distance between each of plural pairs of tire molds and the mold opening/closing position, that is, the moving distance of the tire mold can be substantially identical to each other, and the moving distance can be reduced, thereby being capable of efficiently producing the tire.

(6) Also, since the vulcanized tire cooler and the unvulcanized tire supplier are disposed in a space above the foregoing vulcanizing station, a location space of the tire vulcanizer can be saved.

(7) Further, since the operating mechanism of the bladder within the tire mold and the supply and exhaust mechanism for supplying the heated and pressurized medium within the bladder, the enclosing time is a time necessary when transferring from the tire mold carrier truck to the vulcanizing station, thereby being capable of readily performing the quality management of the tire.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A tire vulcanizer, comprising:

a vulcanizing station including a plurality of vulcanizing molds which are arranged to perform vulcanization;

a mold opening/closing station where one of said plurality of vulcanizing molds is opened, a vulcanized tire is removed from said one vulcanizing mold, an unvulcanized tire is inserted and shaped, and then said one vulcanizing mold is closed;

a mold carrier truck which is movable between said plurality of vulcanizing molds and said mold opening/closing station;

a frame, disposed so as to cover said plurality of tire vulcanizing molds in said vulcanizing station, defining an upper support surface; and an unvulcanized tire storage section supported on said upper support surface of said frame.

2. The tire vulcanizer as claimed in claim 1, wherein said unvulcanized tire storage section comprises a turn table for handling a plurality of unvulcanized tire tables.

3. The tire vulcanizer as claimed in claim 1, wherein said unvulcanized tire storage section comprises:

a straight rail;

a plurality of unvulcanized tire tables disposed on opposite sides of said rail; and a transfer unit movable along said rail for transferring an unvulcanized tire from an unvulcanized tire receiving position to an empty one of said plurality of unvulcanized tire tables and/or for selectively transferring an unvulcanized tire from one of said unvulcanized tire tables to a sweep-away position.

4. A tire vulcanizer, comprising:

a vulcanizing station including a plurality of tire vulcanizing molds;

a mold opening/closing station, located adjacent said vulcanizing station;

a mold carrier truck which is moveable between said plurality of vulcanizing molds in said vulcanizing station and said mold opening/closing station, wherein a selected one of said plurality of vulcanizing molds is moved to said mold opening/closing station and opened, a vulcanized tire is removed from said one vulcanizing mold, an unvulcanized tire is inserted and shaped, and then said one vulcanizing mold is closed;

a vulcanized tire cooler having a base; and an unvulcanized tire supply apparatus having a base, wherein said vulcanized tire cooler and said unvulcanized tire supply apparatus are located in a space above said vulcanizing station.

5. The tire vulcanizer as claimed in claim 4, wherein said vulcanized tire cooler further comprising:

rails disposed on said base of said vulcanized tire cooler;

a truck positioned on said rails so as to run thereon along said base of said vulcanized tire cooler;

a plurality of cooling unit assemblies positioned on opposite sides of said rails, each of said plurality of cooling unit assemblies including an upper cooling rim and a lower cooling rim;

a cooling assembly open/close unit disposed adjacent said rails; and a cooling assembly gripping unit disposed on said truck for gripping, individually, said plurality of cooling unit assemblies.

6. The tire vulcanizer as claimed in claim 4, further comprising:

rails disposed on said base of said tire supply apparatus;

a truck moveable supported on said rails disposed on said base of said tire supply apparatus;

a plurality of unvulcanized tire support tables positioned on opposite sides of said rails;

a tire gripping unit, disposed on said truck, so as to grip an unvulcanized tire at an unvulcanized tire receiving position in order to supply the unvulcanized tire to an empty support table of said plurality of tire support tables, and to grip an unvulcanized tire on said tire support table in order to transport the unvulcanized tire to a sweep-away table.

7. The tire vulcanizer as claimed in claim 4, further comprising:

a manipulating mechanism for a bladder positioned interiorly of said plurality of tire vulcanizing molds; and a supply/exhaust mechanism for supplying a pressurized medium into or exhausting a pressurized medium from the bladder, said manipulating mechanism and said supply/exhaust mechanism being disposed on said tire mold carrier truck.

* * * * *